US 7,069,547 B2

(12) United States Patent
Glaser

(10) Patent No.: US 7,069,547 B2
(45) Date of Patent: Jun. 27, 2006

(54) METHOD, SYSTEM, AND PROGRAM FOR UTILIZING IMPACT ANALYSIS METADATA OF PROGRAM STATEMENTS IN A DEVELOPMENT ENVIRONMENT

(75) Inventor: Howard Justin Glaser, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 658 days.

(21) Appl. No.: 10/003,950

(22) Filed: Oct. 30, 2001

(65) Prior Publication Data
US 2003/0084425 A1 May 1, 2003

(51) Int. Cl.
*G06F 9/45* (2006.01)

(52) U.S. Cl. .................... 717/154; 717/141; 707/203

(58) Field of Classification Search ............. 717/110, 717/124, 143, 146, 141–142, 148, 153–154; 703/102; 707/203
See application file for complete search history.

(56) References Cited

U.S. PATENT DOCUMENTS

| | | | |
|---|---|---|---|
| 4,864,569 A | 9/1989 | DeLucia et al. | |
| 5,418,957 A | 5/1995 | Narayan | |
| 5,452,449 A | 9/1995 | Baldwin, Jr. et al. | |
| 5,495,610 A | 2/1996 | Shing et al. | |
| 5,724,556 A | 3/1998 | Souder et al. | |
| 5,812,849 A | 9/1998 | Nykiel et al. | |
| 5,898,872 A | 4/1999 | Richley | |
| 6,003,039 A | 12/1999 | Barry et al. | |
| 6,058,264 A * | 5/2000 | Glaser ..................... | 717/101 |
| 6,071,217 A | 6/2000 | Barnett | |
| 6,071,317 A | 6/2000 | Nagel | |
| 6,098,072 A * | 8/2000 | Sluiman et al. ......... | 707/103 R |
| 6,105,036 A * | 8/2000 | Henckel .................. | 707/104.1 |
| 6,182,246 B1 * | 1/2001 | Gregory et al. ............... | 714/38 |
| 6,223,185 B1 * | 4/2001 | Berkland et al. ....... | 707/103 R |
| 6,247,020 B1 * | 6/2001 | Minard ................... | 707/104.1 |
| 6,438,560 B1 * | 8/2002 | Loen ...................... | 707/103 R |
| 6,546,477 B1 * | 4/2003 | Russo et al. ............ | 711/170 |
| 6,658,421 B1 * | 12/2003 | Seshadri ................. | 707/100 |
| 6,691,298 B1 * | 2/2004 | Russo et al. ............ | 717/100 |
| 6,820,184 B1 * | 11/2004 | Russo et al. ............ | 711/170 |
| 6,928,643 B1 * | 8/2005 | McGoogan et al. ...... | 717/162 |
| 6,957,415 B1 * | 10/2005 | Bouchard et al. ........ | 717/106 |

FOREIGN PATENT DOCUMENTS

WO 0023882 4/2000

OTHER PUBLICATIONS

Randall J. Mowen, "Summer 2001 IMS Newsletter", IBM IMS newsletter, Nov. 2000, 26 pages.*

(Continued)

*Primary Examiner*—Anil Khatri
(74) *Attorney, Agent, or Firm*—David W. Victor; Konrad Raynes & Victor, LLP

(57) ABSTRACT

Provided is a method, system, and program for enabling analysis of proposed changes to program statements in a source code file. A data structure is generated indicating a plurality of program statements affected by one of a plurality of selected program statements to change, wherein the data structure indicates a hierarchical relationship of the effect of program statements on one another resulting from changes to the selected program statements. The data structure is provided to a software development tool to enable a programmer to display information on the hierarchical relationship of the affect of the program statements on one another resulting from changes to the selected program statements.

48 Claims, 14 Drawing Sheets

OTHER PUBLICATIONS

Larry Kahm, "Using WebSphere Studio Asset Analyzer", IBM International Technical Support Organization, SG24-6065-00, Mar. 2004, 210 pages.*

Factor et al, "Instrumention of sandard libraries in object oriented languages the twin class hierarchy approach", ACM OOPSLA, pp 288-300, 2004.*

Mens et al, "Maintining software through intentional source code views", ACM SEKE, pp 289296, 2002.*

Harrold et al, "Incremental testing of object oriented class structures", ACM pp 68-80, 1992.*

Xiaoguang et al, An object oriented data framework for virtual environments with hierarchical modeing ACM SIGSOFT, vol. 24, No. 1, pp 65-68, 1999.*

H. Basson, "An Integrated Model for Impact Analysis of Software Change", Laboratoire Informatique de Littoral.

B. Dellen, et al., "Change Impact Analysis Support for Software Development Processess", International Journal of Applied Software Technology, vol. 4, No. 2/3, pp. 95-109.

R.J. Turver, et al., "An Early Impact Analysis Technique for Software Maintenance", Software Maintenance: Research and Practice, 1994, vol. 6, pp. 35-53.

J.P. Queille, et al., "The Impact Analysis Task in Software Maintenance: A Model and a Case Study", IEEE, 1994, pp. 234-242.

S. A. Bohner, "Impact Analysis in the Software Change Process: A year 2000 Perspective", IEEE, 1996, pp. 42-51.

J. Han, "An Approach to Software Change Management Support", Proc. 15th IASTED International Conference, Applied Informatics, Feb. 1997, pp. 322-325.

D. E. Fyock, "Using Visualization to Maintain Large Computer Systems", IEEE Computer Graphics and Applications, Jul./Aug. 1997, pp. 73-75.

Microsoft Corp., "Integrated Development Environment (IDE) Integration" [online], 1997, pp. 1. [Retrieved on Oct. 2001]. Retrieved on the Internet at <URL: http://msdn.microsoft.com/library/en-us/dvnss/html/msdn_ide.asp?frame=true>.

M. Noguchi, et al., Software Maintenance Support Tool Set, Nippon Steel Technical Report, No. 76, Mar. 1998, pp. 69-73.

M.J. Fyson, et al., "Using Application Understanding to Support Impact Analysis", Software Maintenance: Research and Practice, 1998, vol. 10, pp. 93-110.

M. Hutchins, et al., "Improving Visual Impact Analysis", IEEE, 1998, pp. 294-303.

A. Cimitile, et al., "A Software Model for Impact Analysis: A Validation Experiment", IEEE, 1999, pp. 212-222.

IBM, "SCLM: IBM's Best Kept Secret", [online], pp. 1-23; [Retrieved on Oct. 2001]. Retrieved on the Internet at <URL: http://www-4.ibm.com/software/ad/ispf/library/tr292194.html>.

Microsoft Corp., "Visual SourceSafe Managing Source Code by Project" [online], pp. 1. [Retrieved on Oct. 2001]. Retrieved on the Internet at <URL: http://msdn.microsoft.com/SSAFE/technical/managing.asp>.

J. DelMonaco, et al., "IBM Websphere Studio Asset Analyzer: Overview", IBM, 2001, pp. 1-11.

* cited by examiner

METHOD, SYSTEM, AND PROGRAM FOR UTILIZING IMPACT ANALYSIS METADATA OF PROGRAM STATEMENTS IN A DEVELOPMENT ENVIRONMENT

RELATED APPLICATION

This application is related to the copending and commonly assigned patent application entitled "Method, System, And Program For Performing An Impact Analysis of Program Statements In at Least One Source Code File", having Ser. No. 10/003,952 filed on the same date herewith, and incorporated herein by reference in its entirety.

BACKGROUND OF THE INVENTION

1. Field of the Invention

The present invention relates to a method, system, and program for performing an impact analysis of program statements in at least one source code file.

2. Description of the Related Art

One of the challenges when editing code in a program is to understand the effect of changes to certain lines of code to other parts of the program. In the prior art, software developers use a debugging tool to "step" through the program and determine all the execution paths. Based on the information of the execution characteristics determined by "stepping" through the program, the developer can then analyze the execution path to determine the effect the proposed changes to certain statements may have on the current operation of the program including the program statements to change. This process is manually intensive and is based on the capabilities of the developer to properly observe all the effects the proposed changes will have on the execution characteristics.

Moreover, a change in one program may affect the operations of another external application by modifying the content of a shared resource, such as a global variable, memory, file, database record, etc. Currently there is no integrated approach for determining the effects of a proposed change to code on the operation of external applications. In fact, a debugger typically only is aware of the application currently executing, and not the effects on an external application.

In the current art, the software developer is often unable to ascertain the impact of code modifications to the application including the modified code and to external applications, until errors and bugs are detected. At such point, the developer may then have to spend considerable time tracking down the source of the problem to the code change that was made. This problem is further exasperated if the negative impact of a code change is realized in an external application, where the developer or system manager may be totally unaware of the changes made because they were made in a different application. In such case, time will be spent tracking the source of the error to another application, and then to a particular code change in the external application.

For these reasons, there is a need in the art for improved software development tools that assist developers in understanding the impact of modifications to a source program.

SUMMARY OF THE PREFERRED EMBODIMENTS

Provided is a method, system, and program for enabling analysis of proposed changes to program statements in a source code file. A data structure is generated indicating a plurality of program statements affected by one of a plurality of selected program statements to change, wherein the data structure indicates a hierarchical relationship of the effect of program statements on one another. The data structure is provided to a software development tool to enable a programmer to display information on the hierarchical relationship of the affect of the program statements on one another resulting from changes to the selected program statements.

In further implementations, generating the data structure comprises generating an element object in the data structure for one selected program statement to change and generating element objects in the data structure for program statements that are directly or indirectly affected by the selected program statement. The element object representing one program statement is defined as a child element object to the element object for one program statement whose output parameter comprises the input parameter of the program statement represented by the child element object.

The data structure may be implemented as an Extensible Markup Language (XML) file.

Further provided is a method, system, and program for analyzing proposed changes to program statements in a source code file. A data structure is received indicating a plurality of program statements affected by one of a plurality of selected program statements to change, wherein the data structure indicates a hierarchical relationship of the effect of program statements on one another resulting from changes to the selected program statements. The hierarchical relationship of the program statements affected by one of the selected program statements is displayed. User input indication selection of one of the displayed program statements is received and editing of the selected program statement is enabled.

Still further, displaying the hierarchical relationship of the program statements further comprises displaying one program statement affected directly or indirectly by one selected program statement and displaying one program statement as a child in the hierarchical relationship to the program statement whose output parameter comprises the input parameter of the child program statement.

Yet further, editing of the selected displayed program statement is enabled by determining one of a plurality of source code files capable of including the selected displayed program statement, accessing the determined source code file, and displaying in an editing mode a plurality of program statements from the determined source code file including the selected displayed program statement.

The described implementations provide a technique for presenting information to a programmer on how a proposed change to a program statement in one source code file may impact other program statements in the same or other source code files. With the described techniques, the programmer may then select one program statement affected by the proposed change via an interface presenting a hierarchical arrangement of the affected program statements to review and modify if necessary to eliminate any errors that could result from the proposed changes.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Performing an Impact Analysis of Proposed Changes to Program Statements

Figure 1:
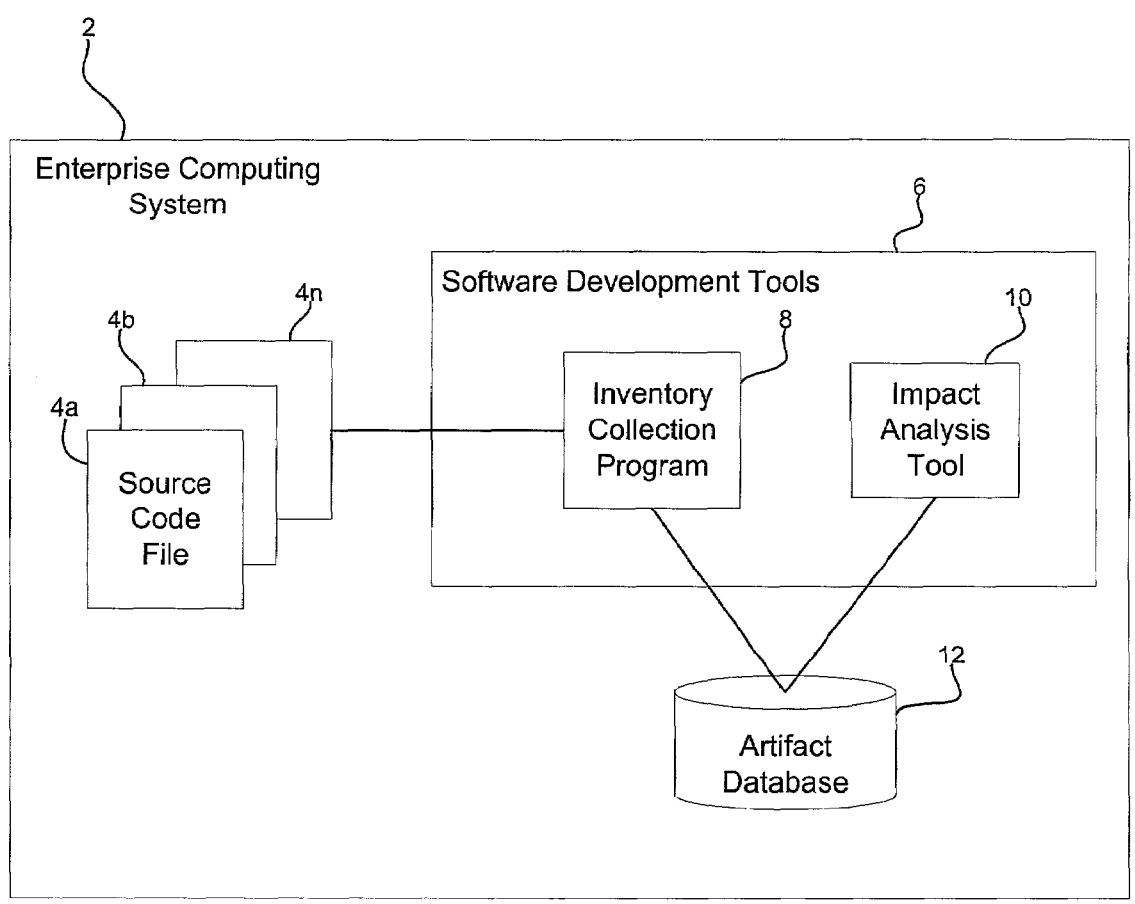
FIG. 1 illustrates a computing environment in which aspects of the invention are implemented in accordance with implementations of the invention.

FIG. 1 illustrates an enterprise computing system 2 which would be implemented across a network environment including one or more server and client computer systems, comprising any type of computing devices known in the art, e.g., workstations, servers, personal computers, mainframes, hand held computers, laptops, personal information managers (PIMs), telephony devices, etc. A plurality of source code files 4a, 4b . . . 4n are maintained in the enterprise computing system 2 and available to a set of software development tools 6 that are implemented on one or more of the computer systems in the enterprise computing system 2. The source code files 4a, 4bb . . . 4n would comprise the source code of application programs used in the enterprise computing system 2 or being developed for deployment in enterprise computing systems.

The source code files 4a, 4b . . . 4n may also include a job control language (JCL) program that includes program statements that call and execute application programs in the system and associates logical and physical entities. For instance, within an application, a logical data set name may be used to reference or call a physical data set. The JCL program provides the association of the logical data set to the physical data set. In fact, the same logical name may be used to reference different physical data sets. The JCL association of physical and logical entities is examined when performing the impact analysis to determine how code modifications can affect a physical data set and, in turn, the statements that reference that physical data set. A set of JCL statements may specify the input data sets (files) to access, output data sets to create or update, resources to allocate for the job, and the programs that are to run using the defined input and output data sets.

The source code files 4a, 4b . . . 4n may be stored in specific file directories or maintained and managed by a source control management system known in the art, such as the International Business Machine Corporation's (IBM) Software Configuration and Library Manager (SCLM), Microsoft Visual SourceSafe, etc.** A source control management system provides a library management system of source code and controls access and provides locking to prevent developer conflicts. An example of a source control management system that may be used to manage developer access to the source code files 4a, 4b . . . 4n is described in the IBM publication "Using ISPF/SCLM for Automated and Controlled Software Development", IBM publication no. SG24-4843-00 (IBM Copyright, October 1996), which publication is incorporated herein by reference in its entirety.

**Microsoft and Visual SourceSafe are trademarks of Microsoft Corporation in the United States, other countries, or both; IBM is a registered trademark of International Business Machines Corporation in the United States, other countries, or both.

The enterprise computing system 2 further includes a set of software development tools 6 deployed on one or more systems to assist software developers in modifying and updating the source files 4a, 4b . . . 4n. The software development tools 6 include an inventory collection program 8 that scans and analyzes all the source files 4a, 4b . . . 4n and generates an artifact database 12 providing metadata on all the program statements and program artifacts referenced in the source files 4a, 4b . . . 4n. A program artifact may comprise a program statement, program variable, Input/Output buffers, files, data sets, or any other data structure known in the art manipulated by a computer program. Once the inventory collection program 8 generates the artifact database 12, then an impact analysis tool 12 may be invoked to analyze any block of statements in any of the source files 4a, 4b . . . 4n. This analysis of the block of statements would generate a report on all the program statements and program artifacts across all of the source files 4a, 4b . . . 4n that could possibly be affected by any change to the selected block of statements.

Figure 2:
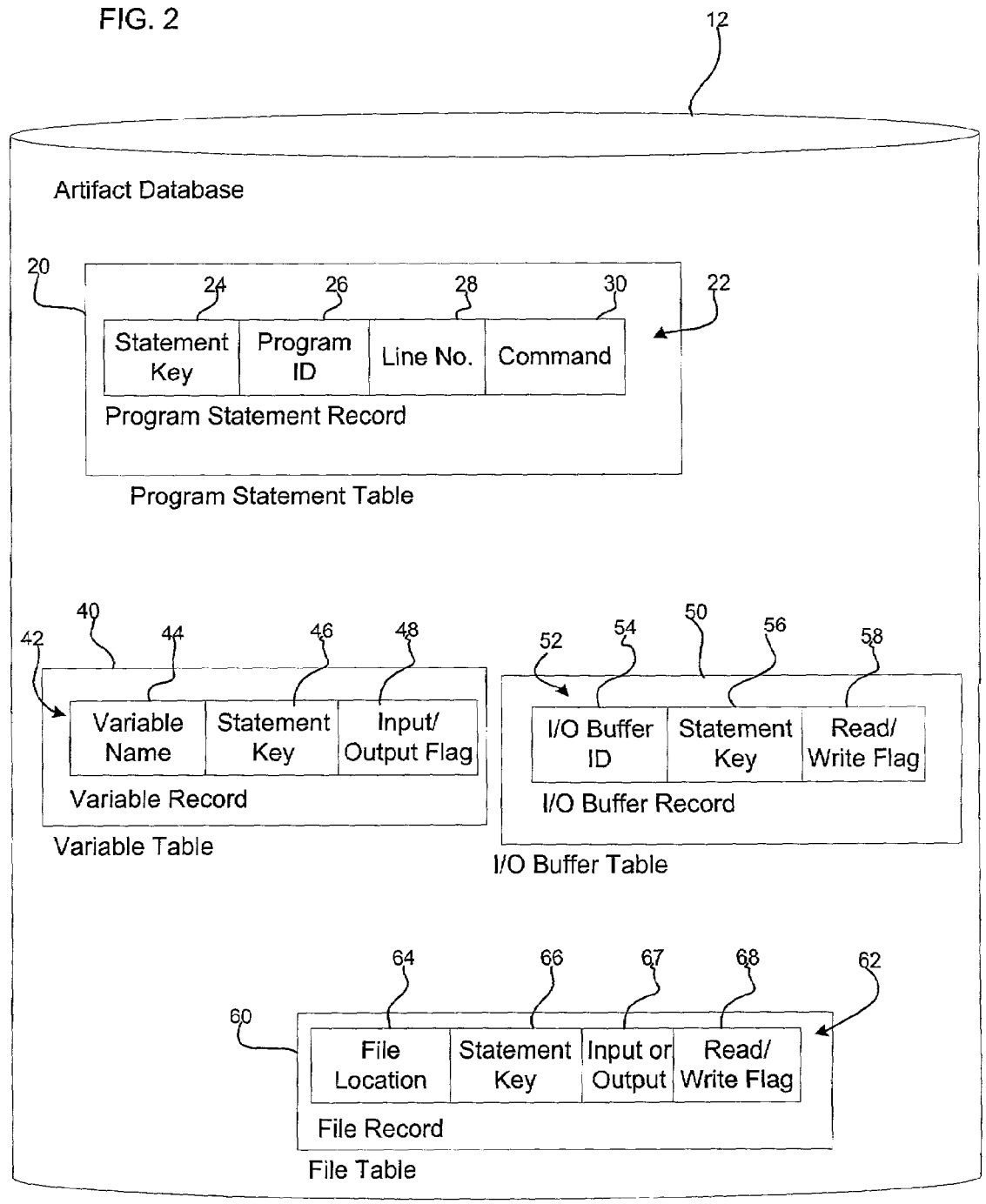
FIG. 2 illustrates data structures maintaining information on program statements and program artifacts throughout source code files in accordance with certain implementations of the invention.

FIG. 2 illustrates a relational database implementation of the artifact database 12 maintaining the artifact elements gathered from the source code files 4a, 4b . . . 4n. The artifact database 12 includes a program statement table 20, a variable table 40, an I/O buffer table 50, and a file table 60. The program statement table 20 includes one record 22 for each program statement in each source code file 4a, 4b . . . 4n. Each program statement record 22 includes a unique statement key 24, a program identifier (ID) 26 uniquely identifying the source code file 4a, 4b . . . 4n including the statement, the line number 28 in the source code file 4a, 4b . . . 4n including the statement, and the statement command name or verb 30. If a line of code includes multiple statements, i.e., verb and input and output parameters, then multiple statement records 22 would be generated for that line of code. The program ID 26 may comprise the file name of the source code file 4a, 4b . . . 4n or, if the program is maintained in a source control management system, then the program ID 26 may comprise the identifier of that source code file 4a, b . . . n in the source control management system library.

The variable table 40 includes one variable record 42 for each instance a variable is referenced in a program statement in any of the source code files 4a, 4b . . . 4n. Each variable record 42 includes a variable name 44, the unique statement key 46 of the program statement in which the variable was referenced, and an input/output flag 48 indicating whether the variable was input to the program statement or the output/target of the program statement and possibly modified. The I/O buffer table 50 includes an I/O buffer record 52 for each instance of a read or write operation to an I/O buffer in a program statement in any of the source code files 4a, 4b . . . 4n. Each I/O buffer record 52 includes the identifier of the allocated I/O buffer 54, the unique statement key 56 of the program statement operating on the I/O buffer, and a read/write flag 58 indicating whether the program statement performed a read or write with respect to the I/O buffer. The file table 60 includes a file record 62 for each instance of a read or write operation to a file in a program statement in any of the source code files 4a, 4b . . . 4n. Each file record 62 includes the identity of the effected file 64, the unique statement key 66 of the statement operating on the file, an Input/Output flag 67 indicating whether the statement performed an input or output with respect to the source code file 4a, 4b . . . 4n, an Input/Output flag 67, and a read/write flag 68 indicating whether the statement performed a read or write with respect to the file.

Figure 3:
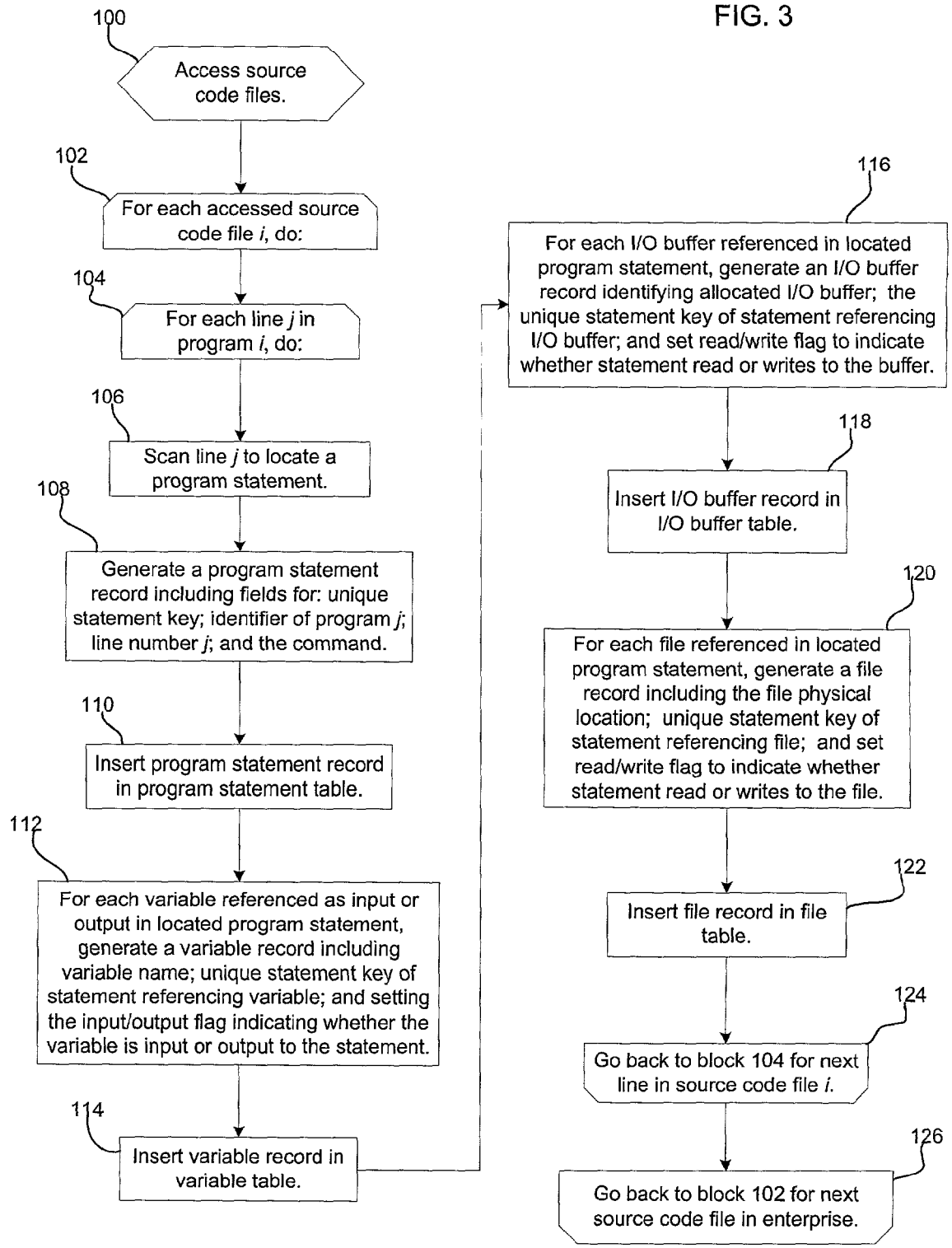
FIG. 3 illustrates logic to process source code files to populate the data structures described with respect to FIG. 2 in accordance with certain implementations of the invention.
Figure 4:
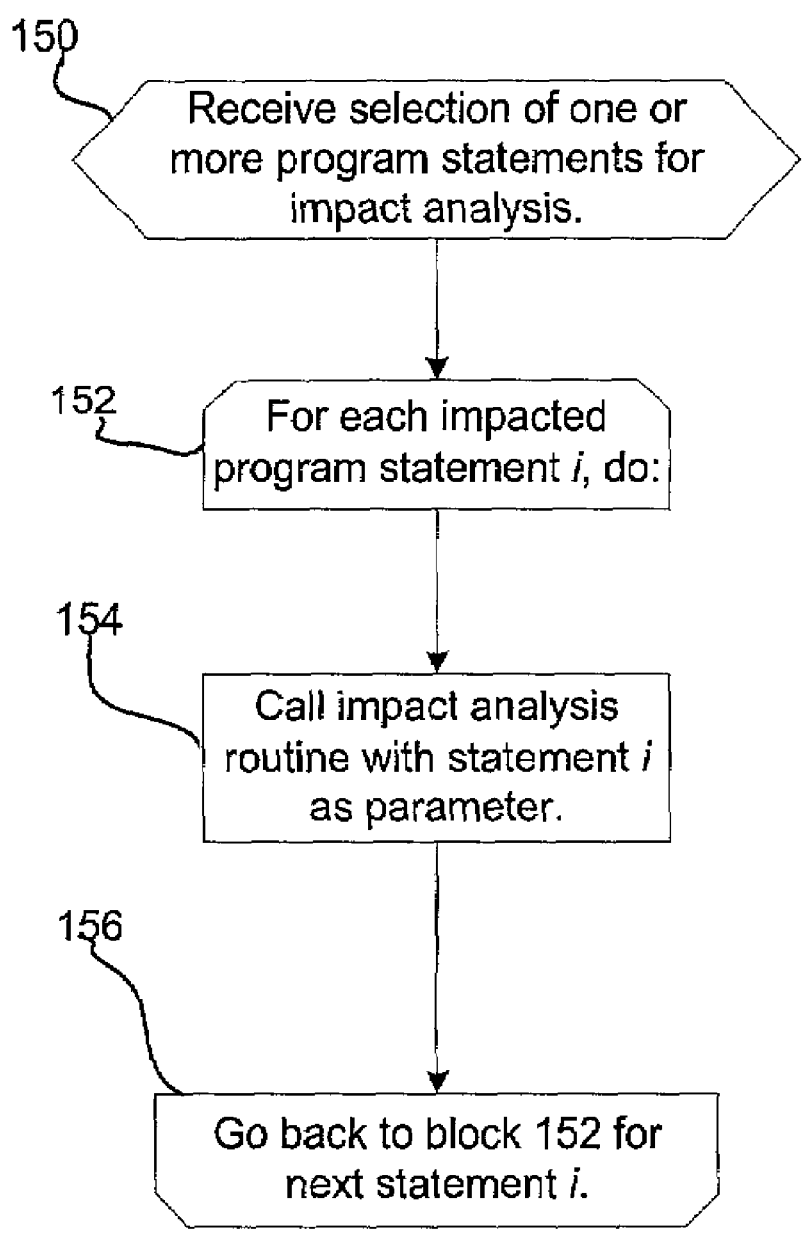
FIGS. 4, 5a, 5b, and 5c illustrate logic to determine the effect a change to selected source code statements may have on statements and program artifacts in source code files in accordance with certain implementations of the invention.

FIG. 3 illustrates logic implemented in the inventory collection program 8 to populate the artifact database 12 with program artifact metadata. The logic of FIG. 3, as well as the logic of FIGS. 4, 5a, 5b, and 5c would be executed by one or more computer systems on which the software development tools are installed. Control begins at block 100 by accessing all the source code files 4a, 4b . . . 4n subject to the analysis, either through the file directory or by accessing the source code files 4a, 4b . . . 4n through a control management system. A loop is then performed at block 102 through block 126 for each source code file i to consider. At blocks 104 through 124, the inventory collection program 8 performs a loop for every line j in the source code file i, from the top to bottom of the code. The inventory collection program 8 scans (at block 106) line j for a program statement. If there are multiple program statements in the line, then the steps 108 through 122 will be performed for each statement in the line, where a statement comprises a command verb and an input and output program artifact, e.g., variable, I/O buffer, file, etc., acted upon by the program statement. A program statement record 22 is generated including fields having: the unique statement key 24, which would be generated with the record; the program identifier 26; line number j 28; and the command verb 30, which may comprise a command specifying a particular operation to be performed on the input and output parameters or a call to a subroutine within the source code file i or to a routine in an external source code file 4a, 4b . . . 4n. Block 110 then inserts the generated program statement record 22 is then inserted into the program statement table 20 in the artifact database 12.

For each variable referenced as an input or output parameter in the located program statement, the inventory collection program 8 generates (at block 112) a variable record 42 including: the variable name 44, the unique statement key 46 identifying the program statement referencing the variable as an input or output parameter, and sets the Input/Output flag 48 to indicate whether the variable is an input parameter or output parameter to the statement. The generated variable record 42 is inserted (at block 114) into the variable table 40. For each I/O buffer referenced in the program statement, an I/O buffer record 52 is generated (at block 116) including an identifier of the I/O buffer 54, the statement key 56 of the program statement operating on the I/O buffer as a parameter; and a read/write flag 58 indicating whether the program statement performs a read or write operation with respect to the I/O buffer. The generated I/O buffer record 52 is then inserted (at block 118) into the I/O buffer table 50. For each file referenced in the program statement, a file record 62 is generated (at block 120) including an identifier of the file 64 (such as the physical location of the file in the file system), the statement key 66 of the program statement operating on the file, and a read/write flag 68 indicating whether the statement performs a read or write operation with respect to the file. The generated file record 62 is then inserted into the file table 60.

At block 124, control proceeds back to block 104 to process the next line of the source code file i. After processing all the lines in the source code file i, control proceeds (at block 126) back to block 102 to process the next source code file 4a, 4b . . . 4n being considered. The result of the logic of FIG. 3 is an artifact database 12 populated with metadata about all statements in the source code files 4a,b . . . n and all program artifacts that are affected by the statements. The inventory collection tool 8 may update the artifact database 12 if one source code file 4a, 4b . . . 4n is changed. This update may be performed by removing all records that reference the updated source code file 4, b . . . n and then performing the logic of FIG. 3 to add the metadata on all the program artifacts back to the artifact database 12.

Figure 5A:
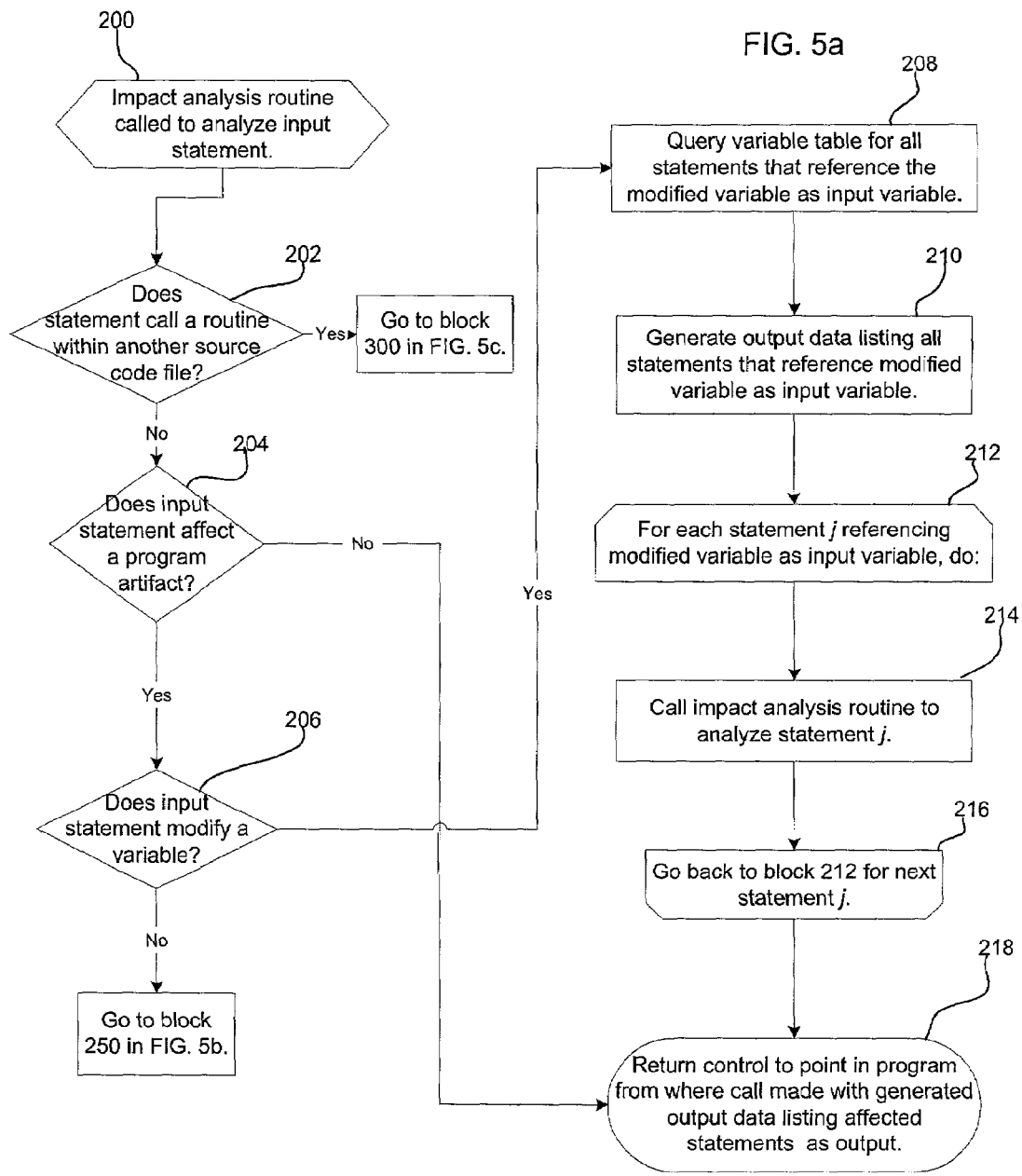
Figure 5B:
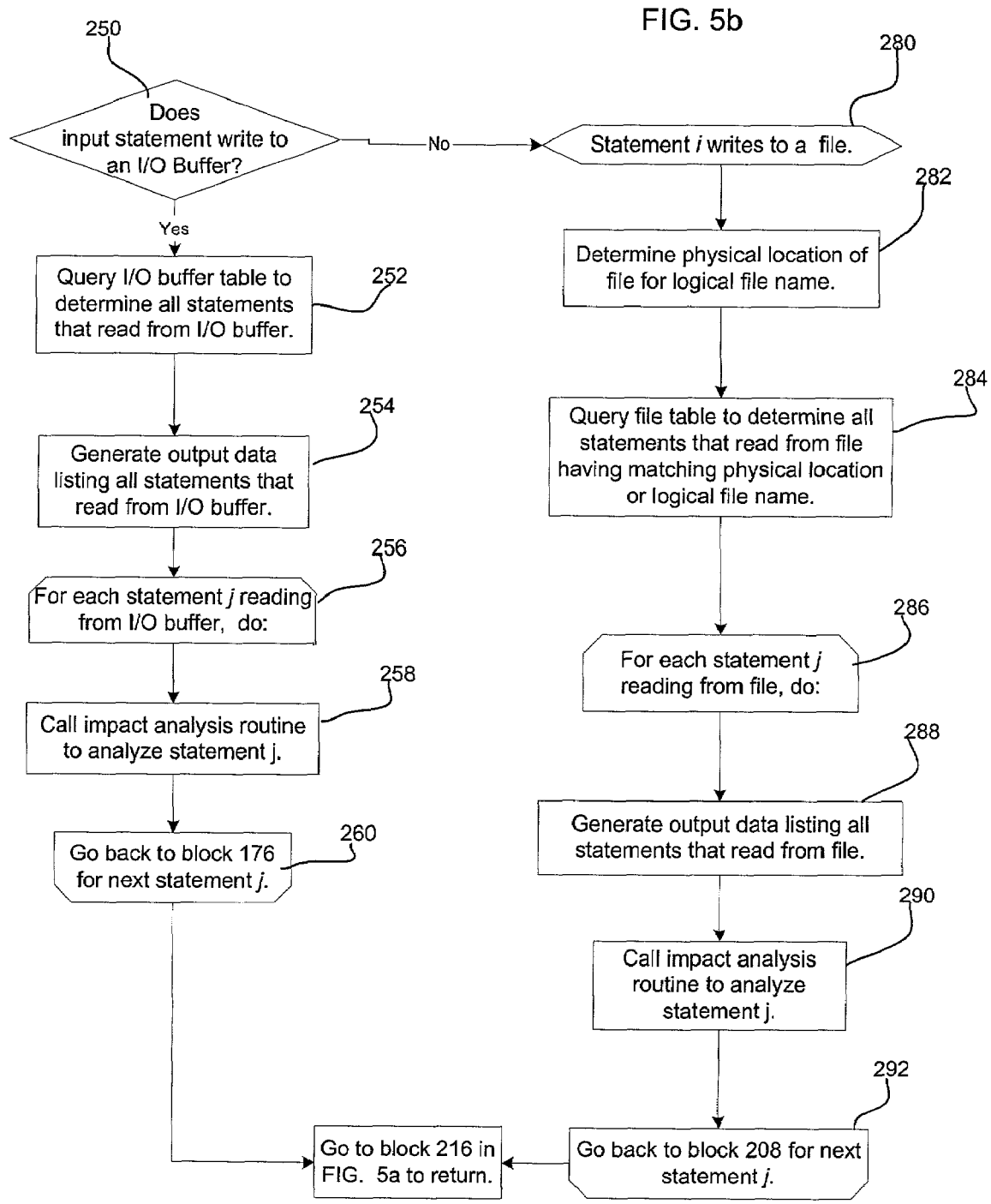
Figure 5C:
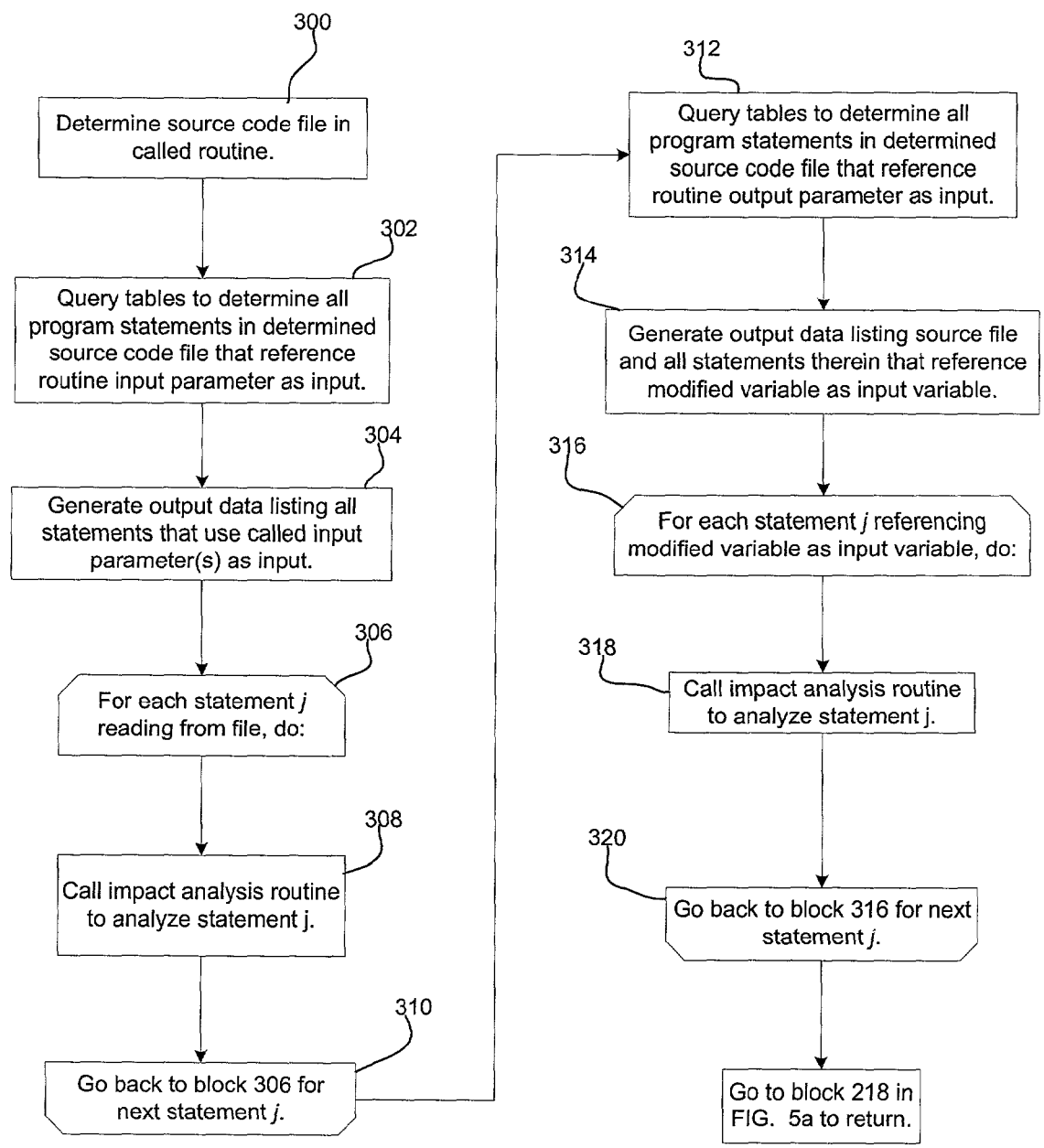

FIGS. 4, 5a, 5b, and 5c illustrate logic implemented in the impact analysis tool 10 to query the artifact database 12 to determine all program artifacts across all the source code files 4a, 4b . . . 4n that may be affected by a change to a selected one or more program statements in one source code file 4a, 4b . . . 4n. As discussed, the user may select one or more lines of code in one source code file 4a, 4b . . . 4n for the impact analysis tool 10 to consider. Control begins at block 150 in FIG. 4 upon receiving a call to the impact analysis tool 10 and selection of one or more program statements to subject to impact analysis. For each of the program statements subject to analysis, a loop is performed at blocks 152 through 156. At block 154, an impact analysis routine is called with statement i as an input parameter to determine all program artifacts directly and indirectly affected by statement i FIGS. 5a, 5b, and 5c illustrate the logic of the impact analysis routine.

At block 200 in FIG. 5a. a call is made to the impact analysis routine to analyze an input program statement. If (at block 202) the input program statement does not call another routine within the same or external source code file 4a, 4b . . . 4n and if (at block 204) the input program statement affects a program artifact, then a determination is made at block 206 of whether the input statement modifies a variable. An input program statement would not affect a program artifact if it does not modify the program artifact, such as the case if the input program statement specifies that data be sent to a printer or other output device that does not modify any other variable, file or I/O buffer. If the input program statement modifies an input variable (from the yes branch of block 206), then the impact analysis routine would query (at block 208) the variable table 40 to determine all statements that reference the modified variable, i.e., have the same variable name 44, as an input parameter, i.e., the Input/Output flag 48 is set to indicate input. An output data listing of all statements that reference the modified variable as an input parameter is produced (at block 210). At blocks 212 through 216, for each statement j referencing a modified variable as an input variable, the impact analysis routine makes a recursive call (at block 214) to the impact analysis routine, which begins at block 200, with statement j as an input variable to determine all program artifacts that statement j, which has as an input parameter a variable affected directly by the program statement i or indirectly by another program statement affected by the program statement i. After control is returned from the nested call to the impact analysis routine, control proceeds to block 218 to return control to the point in the program where the call to the impact analysis routine was made, which may be at block 154 in FIG. 4 or within a nested call within FIGS. 5*a*, 5*b*, and 5*c* from where the impact routine was called. Control is returned with information output indicating all the directly and indirectly affected program statements.

If (at block 206) the input program statement does not modify a variable and if (at block 250) the input program statement does write to a target I/O buffer, then the impact analysis routine queries (at block 252) the I/O buffer table 50 to determine all I/O buffer records 52 identifying the target I/O buffer and that indicate in the read/write flag 58 that the statement reads from the I/O buffer. From the determined I/O buffer records 52, the impact analysis routine determines and generates output data (at block 254) of all statements read from the target I/O buffer as indicated from the statement key 56 value in the determined I/O buffer records 52. A loop is then performed at blocks 256 through 260 for each program statement reading from an I/O buffer affected by the input program statement. At block 258, the impact analysis routine is called (at block 200 in FIG. 5*a*) with one determined program statement that reads from the affected I/O buffer as an input parameter to determine all further program artifacts affected by the program statement reading from the affected I/O buffer.

If (at block 250) the input program statement does not write to an I/O buffer, then the impact analysis routine assumes that the input statement writes to a file (at block 280), which is the last program artifact to consider in the logic of FIGS. 5*a*, 5*b*, and 5*c*. Those skilled in the art will appreciate that the logic of FIGS. 5*a*, 5*b*, and 5*c* can be extended to consider the effect on program artifacts other than variables, I/O buffers, and files. At block 282, the impact analysis routine determines the physical location of the file in the file system if the statement operates on a logical file name. Such physical location may be provided by a declaration in the source code file i or an external job control language program defining a logical name associated with a physical file. At block 284, the impact analysis routine queries the file table 60 to determine all file records 62 identifying the target file modified by the statement and that indicate in the read/write flag 68 that the statement reads from the file. From the determined file records 62, the impact analysis routine determines statements that read from the target file from the statement key 66 value in the determined file records 62. The routine generates output data indicating all statements that read from the affected I/O buffer. A loop is then performed at blocks 286 through 290 for each program statement reading from an I/O buffer affected by the input statement. At block 288, the impact analysis routine is called (at block 200 in FIG. 5*a*) with one determined program statement that reads from the affected file as an input parameter to determine all further program artifacts affected by the program statement reading from the affected file. From blocks 260 or 292, control proceeds to block 218 to return to the point in the program execution where the call to the impact analysis routine was made.

If (at block 204) the input statement does not affect a program artifact, such as the case if the statement writes data to a printer, display monitor, etc., then control proceeds to block 218 to return control to the point in the program execution where the call to the impact analysis routine was made. If (at block 202) the input statement calls a routine within the same or another source code file 4*a*, 4*b* . . . 4*n*, then control proceeds to block 300 in FIG. 5*c* to determine the impact from modifying a program statement including a call to another program routine comprised of one or more program statements.

With respect to FIG. 5*c*, at block 300, the impact analysis routine determines the source code file including the called routine. The program statement table 20 is then queried (at block 302) to determine all program statement records 22 that reference the input parameter of the called routine as input. This operation is performed to determine all statements in the called routine that may use the routine input parameter to affect other program artifacts. This determination of statements in the called routine that use the input parameter as input can be determined by a query of the variable table 40, I/O buffer table 50, and file table 50 of all table records 42, 52, and 62 having a statement key 46, 56, or 66 identifying a statement in the called source code file 4*a*, 4*b* . . . 4*n* (previously determined by a query of the program statement table 20 for all program statement records 22 including the called source code file as the program ID 26 and whose input/output flag 48, 58, or 68 indicates that the input parameter is input to the program statement. Output is then generated (at block 304) of all statements that use the called input parameter as input. For each determined statement j referencing the input parameter as input, a loop is performed at blocks 306 through 310 where the impact analysis routine is called (at block 308) to determine all program artifacts affected by statement j.

The impact analysis program than determines at blocks 312 through 320 the impact on all program statements that reference the output parameter of the called routine as input, i.e., that may use the parameter affected by the called routine. At block 312, the impact analysis routine queries the tables 20, 40, 50, 60 to determine all program statement records 22 that reference the output parameter of the called routine as input. This can be determined by a query of the variable table 40, I/O buffer table 50, and file table 50 of all table records 42, 52, and 62 having a statement key 46, 56, or 66 identifying a statement in the called source code file 4*a*, 4*b* . . . 4*n* (previously determined by a query of the program statement table 20 for all program statement records 22 including the called source code file as the program ID 26) and whose input/output flag 48, 58, 68 indicates that the output parameter to the routine is input to the statement. Output is then generated (at block 314) of all routine statements that use the called output parameter as input. For each determined statement j referencing the routine output parameter as input, a loop is performed at blocks 316 through 320 where the impact analysis routine is called (at block 318) to determine all program artifacts affected by statement j.

The resulting output of a call to the impact analysis tool 10 to analyze one or more statements in a source code file 4*a*, *b* . . . *n* is a list of all program statements that reference an input parameter that may be affected by a modification to the analyzed statement. This output lists statements referencing as input a program artifact that is directly affected by the analyzed statement as well as program artifacts indirectly affected, i.e., statements that reference an input program artifact that was affected by a statement referencing an input parameter affected by the analyzed statement, etc. From block 320, control proceeds to block 218 in FIG. 5a to return control to the point in the program from where the call to the impact analysis routine was generated.

In further implementations, the impact analysis tool 10 may also generate extended information explaining the source of the affect on a listed program statement. As discussed, at block 210, 254, 288, and 314 in FIGS. 5a, 5b, and 5c, the impact analysis tool 10 generates output data listing all program statements that reference a modified program artifact as an input statement. Thus, when generating information at this point, the impact analysis tool 10 may further generate extended information for an affected program statement identifying the previous program statement that modifies the program artifact used as the input statement by the affected program statement and also provide information on the exact transformation performed by the previous program statement that modifies the program artifact used as the input statement.

After the impact analysis tool 10 generates the output of affected source code files and program statements therein, the software developer may review the output listing of affected statements across all files 4a, 4b . . . 4n to determine what impact the proposed changes will have on all the different application programs comprised of one or more of the source code files 4a, 4b . . . 4n that include the affected statements.

The resulting output of a call to the impact analysis tool 10 to analyze one or more statements in a source code file 4a, b . . . n is a list of all program statements that reference an input parameter that may be affected by a modification to the analyzed statement. This output lists statements referencing as input a program artifact that is directly affected by the analyzed statement as well as program artifacts indirectly affected, i.e., statements that reference an input program artifact that was affected by a statement referencing an input parameter affected by the analyzed statement, etc. The software developer may review the output listing of affected statements across all files 4a, 4b . . . 4n, which are part of one or more application programs, to determine what impact the proposed changes will have on all the different programs, including the application program source code file having the affected statement.

Using Impact Analysis Results in an Integrated Development Environment

After running the impact analysis tool 10, in further implementations, one or more projects may be generated that would utilize the program statement metadata generated from the impact analysis tool 10 to generate one or more projects that would be provided to a software development tool, such as integrated development environment (IDE) tools known in the art. The software development tool includes an editor to allow editing of the program statements in source code files. The projects define source code files containing statements affected by the proposed changes and enable programmers to review the impacted statements to determine whether the impacted statements must be modified and, if so, enable the programmer to edit the impacted statement to eliminate any potential errors or bugs that would otherwise arise from the proposed changes.

In certain implementations, the output of the impact analysis tool 10 may include a list of files including program statements that are affected by the proposed changes, the line number of the affected statements for each file, and extended information providing further details of the previous program statement that modifies the program artifact used as input to the affected program statement. Using this information, the system analyst can then assign one or more of the affected files to one or more projects designated for a specific programmer. The programmer may also create a project from the impact analysis tool independent of the analyst using the impact analysis tool and then load the project into the software development tool. The software development tool provides a graphical user interface (GUI) through which the programmer may open the project containing files into the software development tool to review. The software development tool may then be used to modify, if necessary, the affected statements within the source code file assigned to the project. When loading the project, the software development tool would also access and open the source code files assigned to the project.

Figure 6:
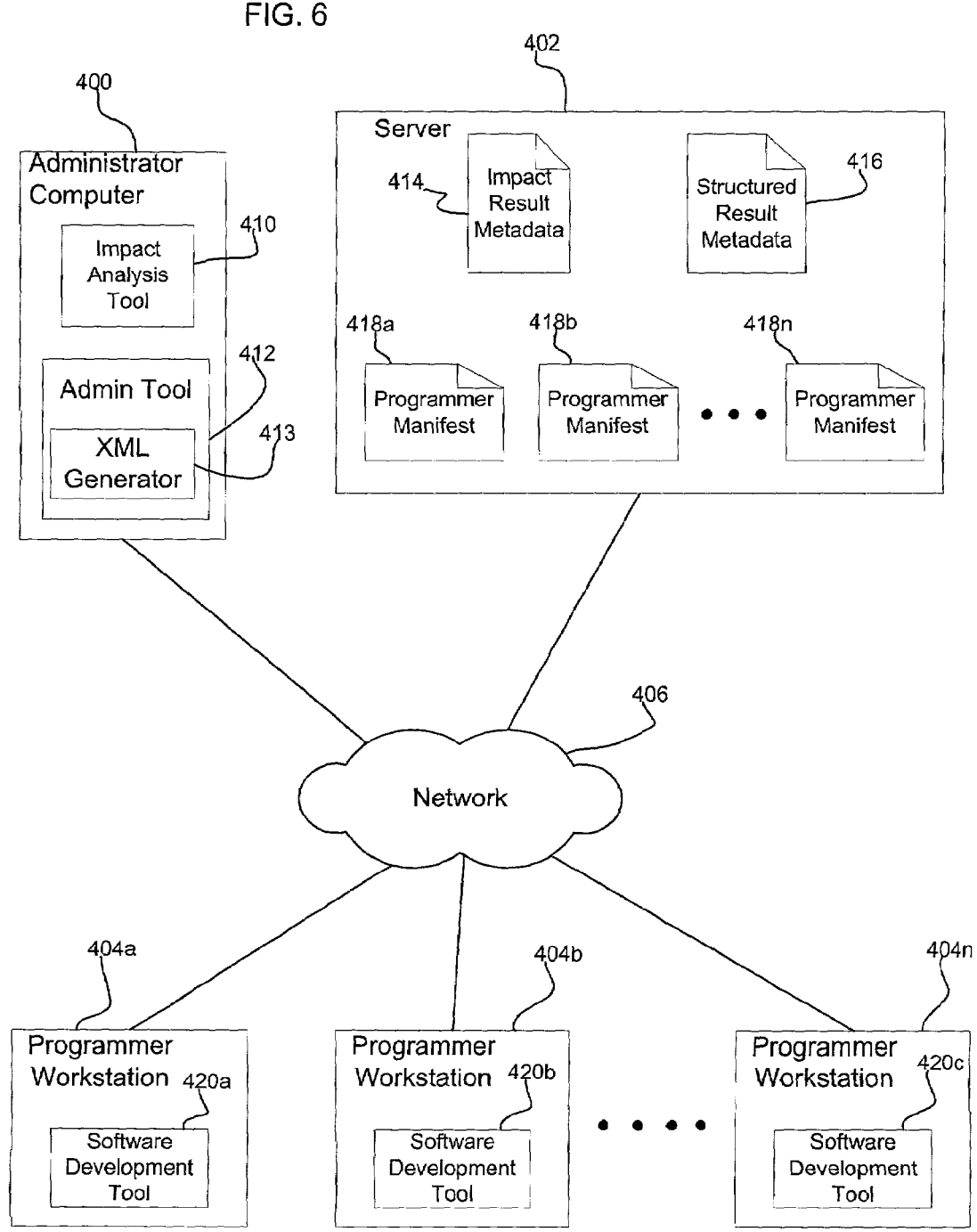
FIG. 6 illustrates a further computing environment in accordance with implementations of the invention.

FIG. 6 illustrates an integrated development environment (IDE) utilizing the impact analysis tool 10 (FIG. 1) described above. An administrator computer 400, server 402, and programmer workstations 404a . . . 404n communicate over a network 406, which may comprise any network known in the art, e.g., a Local Area Network (LAN), Intranet, the Internet, Storage Area Network (SAN), Wide Area Network (WAN), Virtual Private Network (VPN), using any network technology known in the art, e.g., TCP/IP, Fibre Channel, Ethernet, etc. The administrator computer 400 includes an impact analysis tool 410, such as the impact analysis tool 10 (FIG. 1) described above, and an admin tool 412. The admin tool 412 would receive as input the impact result metadata 414 generated by the impact analysis tool 410 in the manner described above. The admin tool 412 would further import impact result metadata 414 and generate structured result metadata 416 in the manner described below that organizes the metadata on the impacted statements in a hierarchical structured manner according to how one statement affects another, i.e., how the output parameter of one program statement is the input parameter of another.

The admin tool 412 would further include a graphical user interface (GUI) to allow a system analyst to assign the source code files 4a, 4b . . . 4n including impacted statements to one or more projects that are delegated to programmers to review and, if necessary, modify. The created project may be included within a manifest 418a, 418b . . . 418n for a particular programmer. Thus, one or more of the source code files 4a, 4b . . . 4n including affected program statements would be assigned to one or more programmers through their programmer manifests 418a, 418b . . . 418n. The programmers to which a manifest 418a, 418b . . . 418n is assigned would use one of the programmer workstations 404a, 4b . . . 4n, which may comprise any computing device known in the art, that runs a software development tool 420a, 420b . . . 420n. The software development tool 420a, 420b . . . 420n is capable of loading the manifest 418a, 418b . . . 418n for a programmer, opening all the source code files 4a, 4b . . . 4n assigned to the manifest, and providing a GUI through which the programmer may navigate through the source code files 4a, 4b . . . 4n and impacted program statements therein in order to eliminate any potential bugs that would result from any direct or indirect effects caused by the proposed changes initially considered by the impact analysis tool 410 when generating the impact result metadata 414. The software development tool program 420a, 420b . . . 420n may highlight all affected program statements in a source code file 4a, 4b . . . 4n that is opened when loading the manifest 418a, 418b . . . 418n.

Figure 7:
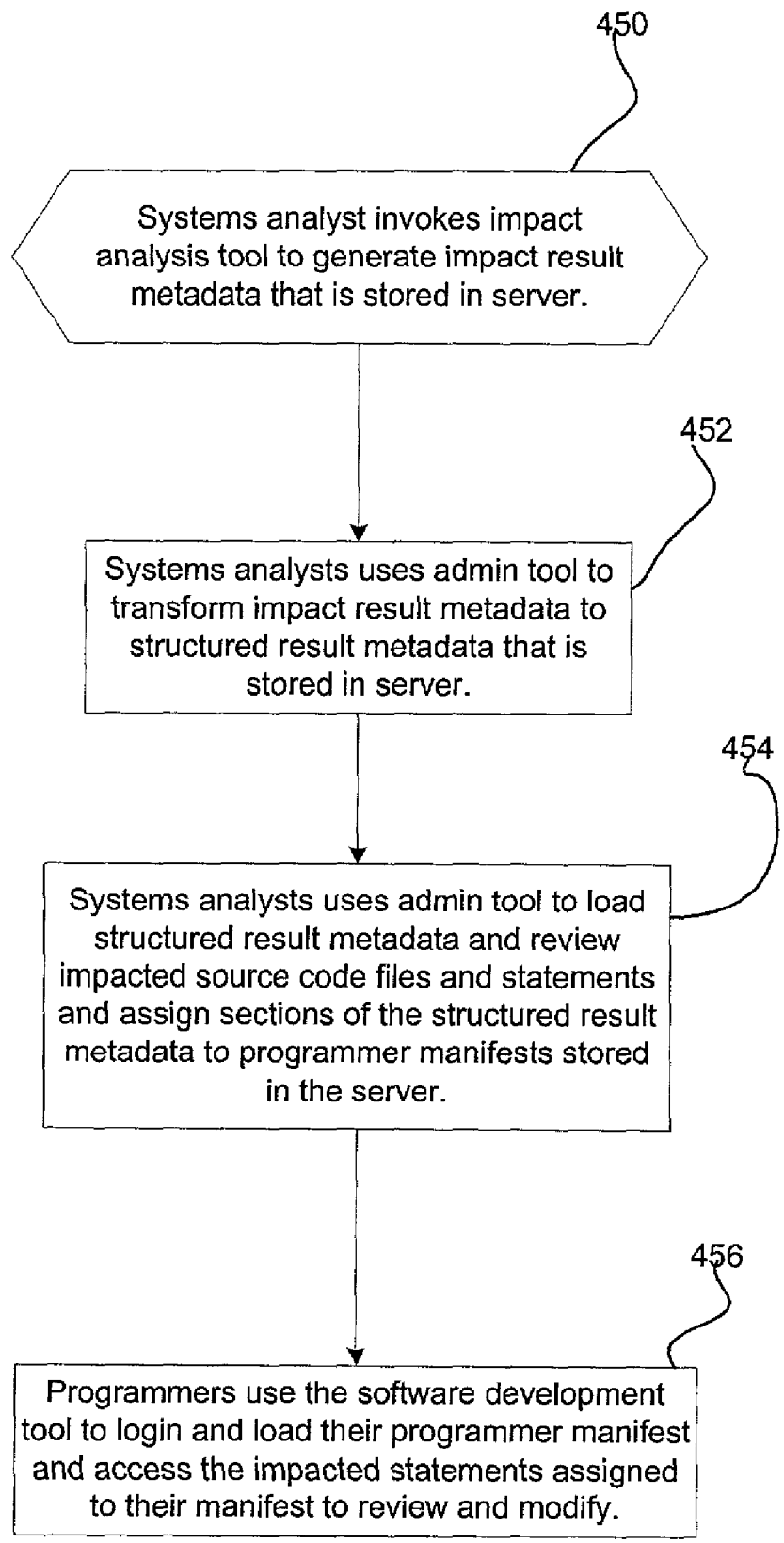
FIG. 7 illustrates logic to utilize the information on the effects of the proposed change to the source code in an integrated development environment in accordance with implementations of the invention.

FIG. 7 illustrates a general flow of the operations in the Integrated Development Environment of FIG. 6. As discussed, the impact result metadata 414 may be used to create projects to be provided to a programmer, or used directly by the programmer to create a project the programmer will open and edit in a software development tool 420a, 420b . . . 420n. Control begins at block 450 with a systems analysts invoking the impact analysis tool 410 at the administrator computer 400 to generate the impact result metadata 414. In certain implementations, the impact result metadata 414 would list, for every program statement to be changed, the unique statement key 24 (FIG. 2) of all the program statements in the source code files 4a, 4b . . . 4n whose input parameter is affected by a change to the selected program statement, i.e., whose input parameter comprises the output parameter of the selected program statement or another statement affected directly or indirectly by the selected program statement. This information would be generated while implementing the logic of FIGS. 4, 5a, 5b, and 5c. For instance, at block 210 in FIG. 5a, for each program statement analyzed, whether that program statement is directly or indirectly affected by the selected program statement, the impact analysis routine 10 may generate the statement key 24 (FIG. 2) uniquely identifying all statements that reference the output parameter of the analyzed statement as an input parameter. Thus, information on the previous program statement affecting the determined program statement is generated during the execution of the impact analysis routine 10. Information on the source code file 4a, 4b . . . 4n and line number including a program statement can be determined using the statement key 24 as an index into the program statement table 20 to find the program statement record 22 (FIG. 2) that identifies the source code file 4a, 4b . . . 4n and line number for the program statement.

In described implementations, the result metadata 414 is organized to indicate for each selected program statement key, the statement keys of all program statements the selected program statement affects. For each statement key, the metadata 414 indicates the statement key of the previous selected program statement or other program statement directly affecting such statement. A program statement is directly affected by another program statement if the input parameter of the affected program statement is the output parameter of the other program statement. For instance, in one implementation, the impact result metadata 414 would be organized such that each selected program statement is followed by a group of delimited program statements that are affected by the selected program statement, and each affected program statement may itself be followed by a delimited subgroup of program statements affected by such program statement. Thus, each program statement indicated by a statement key may be associated with a group of program statements that it in turn affects.

Figure 8:
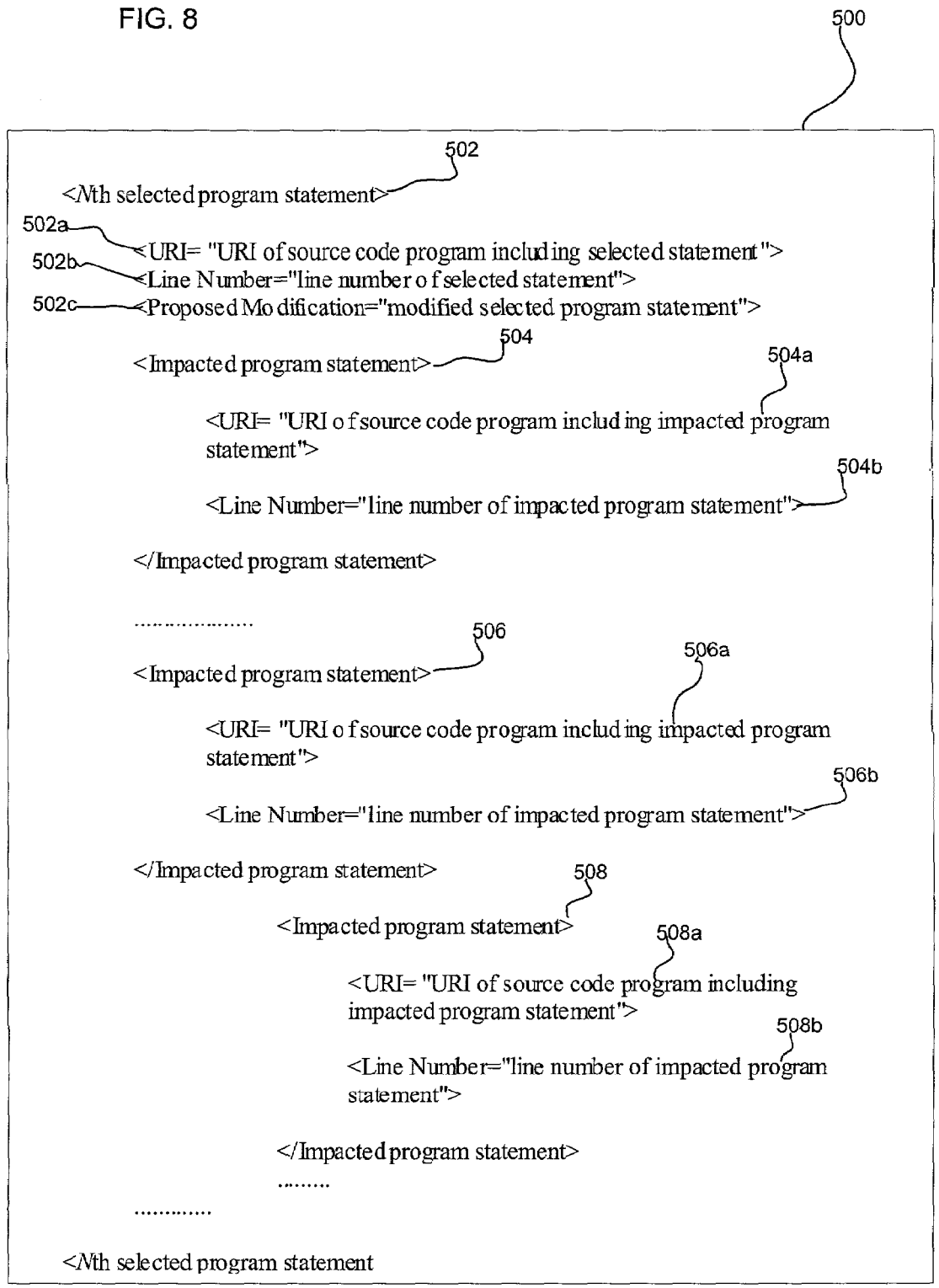
FIG. 8 illustrates an example of a format in which metadata on the program statements affected by the proposed changes is stored in accordance with implementations of the invention.

The systems analysts then invoke the admin tool 412 (at block 452 in FIG. 7) and load in the impact result metadata 414 generated at block 450. At block 452, the admin tool 412 may then transform the loaded impact result metadata 414 into a structured result metadata 416. FIG. 8 illustrates an implementation of the structured result metadata 416 as an XML file 500. Each of the selected statements and program statements affected by one selected program statement are represented as element objects arranged in a hierarchical order to reflect the affect of the program statements on one another. Each program statement element object includes two attributes, one attribute indicating the path or address 502a, e.g., Universal Resource Identifier (URI), file path/directory, world wide name, etc., of the source code file 4a, 4b . . . 4n including the statement and the second attribute of the line number 502b of the program statement in the source code file 4a, 4b . . . 4n. Further, each of the selected program statements include a proposed modification attribute 502c that provides the proposed change to the selected program statement. The programmers need to consider such information in order to determine the effect of the proposed change on affected program statements. As shown in FIG. 8, each selected program statement comprises a first level element object 502. Information on each program statement whose input parameter comprises the output parameter of the selected program statement identified as element object 502 is added as a second level program statement element object 504 and 506, each including the URI 504a and 506a, and line number 504b and 506b attributes. Any program statement whose input parameter comprises the output parameter of a program statement identified at one hierarchical level in the element structure would be identified as an element at a next hierarchical level in the element structure, such as the program statement element object 508, having attributes 508a and 508b. In this way, all the recursive levels of program statements whose input parameter comprises the output parameter of another program statement directly or indirectly affected by the selected program statement is added at a next lower level of the element hierarchy, thereby providing a hierarchical arrangement starting from the selected program statement down through each level of program statements whose input parameter is the output parameter of one previous affected program statement.

Figure 9:
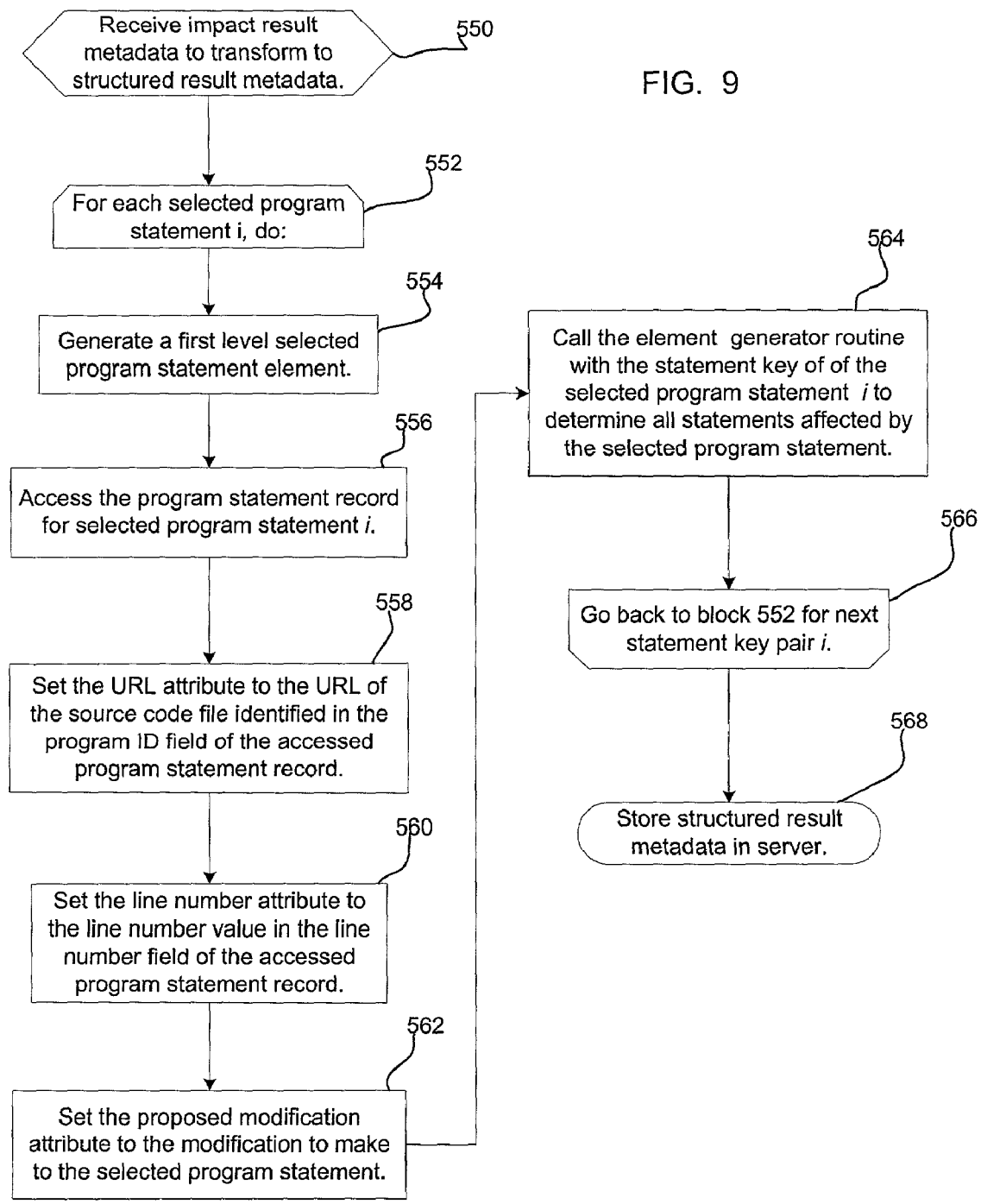
FIGS. 9 and 10 illustrates logic to generate the metadata format shown in FIG. 8 in accordance with implementations of the invention.
Figure 10:
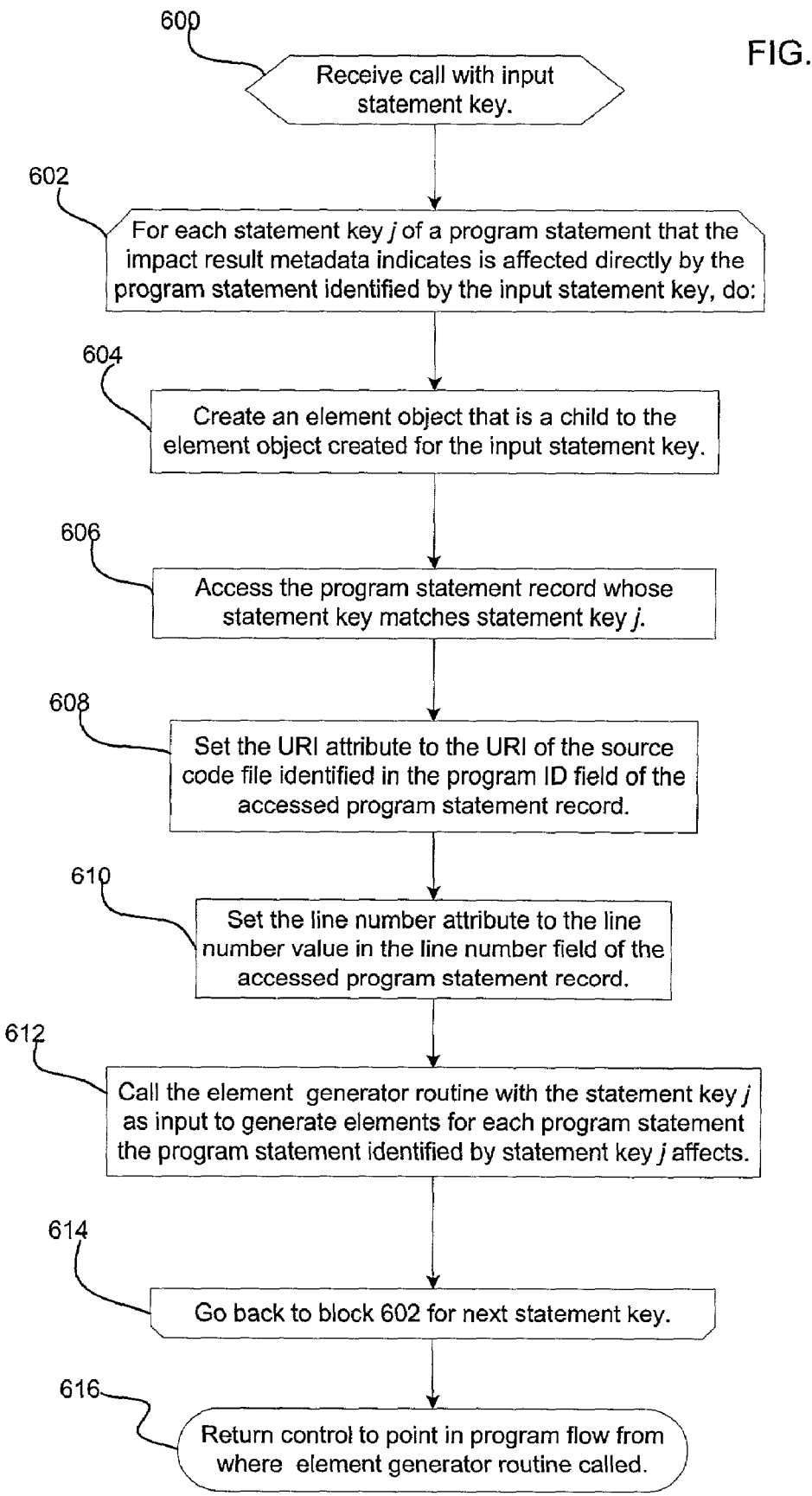

FIGS. 9 and 10 illustrate logic implemented in the admin tool 412 to generate the XML document 500 from the impact result metadata 414. Control begins at block 550 upon loading the impact result metadata 414 from the server 402. The admin tool 412 then performs a loop at blocks 552–566 for each selected program statement key i. At block 554, a first level selected program statement element object 502 (FIG. 8) is generated for statement key i. The program statement record 22 (FIG. 2) having a statement key field 24 matching statement key i is accessed (at block 556) and the URI attribute 502b is set (at block 558) to the URI of the source code file 4a, 4b . . . 4n identified in the program ID field 26 (FIG. 2) of the accessed program statement record 22. The line number attribute 502b is set (at block 560) to the value in the line number field 28 of the accessed program statement record 22 (FIG. 2). The proposed modification attribute 502c is then set (at block 562) to the modified selected program statement. The admin tool 412 then calls (at block 564) an XML generator routine 413 (shown in FIG. 6) with the statement key i as the input parameter to recursively generate elements for every program statement represented by a statement key indicated in the impact result metadata 414 as affected, either directly or indirectly, by the selected program statement i. After generating elements 504, 506, 508 and the associated attributes for each affected program statement, control proceeds (at block 566) back to block 552 to generate all the elements for the next selected program statement and store (at block 568) the structured result metadata 416.

FIG. 10 illustrates the logic for the XML generator routine 413 that is recursively called to generate all the elements for affected program statements. At block 600, the XML generator routine 413 is called with an input statement key in order to recursively determine all program statements that depend directly or indirectly from the input statement key.

The admin tool 412 then processes the impact result metadata 414 to perform a loop at blocks 602 through 614 for each statement key j of program statement that the impact result metadata 414 indicates is affected directly by the program statement having the input statement key, i.e., the program statement whose input parameter comprises the output parameter of the program statement identified by the input statement key. At block 604, an element object 504, 506, 508 is created that is a child of the element object for the program statement having the input statement key. The program statement record 22 having a statement key field 24 (FIG. 2) that matches the statement key j is accessed (at block 606). The URI attributes 504a, 506a, and 508a are set (at block 608) to the URI of the source code file 4a, 4b . . . 4n identified in the program ID field 26 of the accessed program statement record 22, and the line number field 28 is set (at block 610) to the value in the line number field 28 of the accessed program statement record 22. A recursive call is then made (at block 612) to the XML generator routine 413 with the statement key j as the input parameter to recursively execute the logic of FIG. 10 to generate child element objects to the element object for statement key j for program statements that are affected by any change to statement key j. After control returns from the call to the XML generator routine 413 made at block 612, control proceeds to block 614 to perform another iteration for the next statement key. After generating all the child element objects and sub-children thereof, for one level, control returns (at block 616) to the point in the execution path from where the call to the XML generator routine 413 was made to continue processing. After generating element objects for the selected program statements and all affected program statements, the admin tool 412 stores (at block 568 in FIG. 9) the structure result metadata 415 produced by the logic of FIGS. 9 and 10 in the server 402. With the logic of FIGS. 9 and 10, a hierarchical arrangement of element objects in the structured result metadata 416 is generated.

With respect to FIG. 7, after the structured result metadata 416 is stored in the server at block 452, a system analyst may then use the admin tool 412 interface to assign (at block 454 in FIG. 7) particular portions of the structured result metadata 416 to programmer manifests 418a, 418b . . . 418n to different programmers, wherein the programmer must present authorization to access one particular programmer manifest 418 a . . . n. Thus, each programmer manifest 418a, 418b . . . 418n comprises a project for a particular programmer to analyze affected program statements and modify if necessary.

Programmers at the programmer workstations 404a, 4b . . . 4n would then use their software development tool 420a, 420b . . . 420n programs (at block 456 in FIG. 7) to download their particular programmer manifest 418a, 418b . . . 418n after some authentication process in order to review and modify affected program statements assigned to their manifest 418a, 418b . . . 418n.

Figure 11:
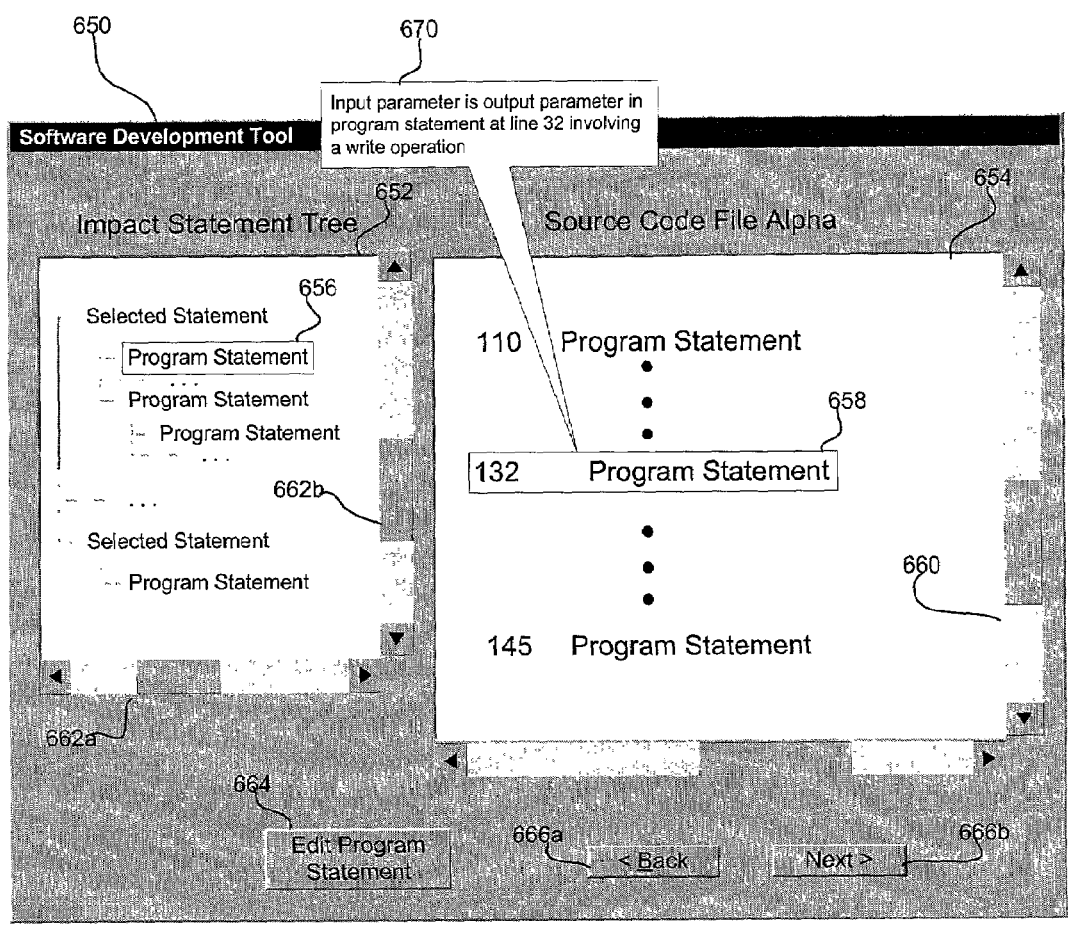
FIG. 11 illustrates a graphical user interface (GUI) enabling the user to select and edit the program statements affected by the proposed changes in accordance with implementations of the invention.

FIG. 11 illustrates that a GUI window 650 the software development tool 420a, 420b . . . 420n would generate on a display of the programmer workstation 404a, 4b . . . 4n including a view of the program statements specified in the programmer manifest 418a, 418b . . . 418n. The GUI window 650 displays a panel 652 including a tree of affected program statements displayed in a hierarchical arrangement based on the hierarchical ordering of the program statement element objects in the structured result metadata 416. The displayed program statements at lower levels of the hierarchical tree in the navigation pane 652 have one input parameter affected by the output parameter of the displayed parent program statement in the panel 652. Upon selecting a program statement at the lowest displayed level, the software development tool 420a, 420b . . . 420n may display further lower levels of affected program statements. Upon the programmer selecting one of the affected program statements in the navigation panel 652, the software development tool 420a, 420b . . . 420n would then access the source code file 4a, 4b . . . 4n including the selected program statement displayed in the navigation panel 652 and display the section of the source code file 4a, 4b . . . 4n including the selected program statement in the code panel 654. The code panel 654 would display a portion of the source code file including the selected program statement at the line number attribute identified in the line number attribute 504b, 506b, and 508b of the element object 504a, 506a, and 508a provided for the selected program statement.

In FIG. 11, the user has selected program statement 656 in the navigation pane 652, causing a section of a source code file alpha to be displayed in the code pane 654, including the selected program statement 658 that was selected in the navigation pane 652. The user programmer may then further click the selected program statement 658 displayed in the code pane 654 to edit that selected program statement 658 in the source code file 4a, 4b . . . 4n. The programmer may use the scroll bars 660 in the code pane 654 to view further program statements in the displayed source code file 4a, 4b . . . 4n. Scroll bar 662a and 662b may be used to display further affected program statements in the hierarchical relationship. As discussed, the software development tool 420a, 420b . . . 420n may display all impacted program statements as highlighted or with some other graphical indicator, so that when the programmer is scrolling through the source code file 4a, 4b . . . 4n displayed in the code pane 654 (FIG. 11), all the affected program statements to review are highlighted and readily observable.

The edit program statement button 664 may be used to enable the programmer to directly edit the program statement 656 selected in the navigation pane 652. The back 666a and next 666b buttons may be used to navigate forward and backward through the hierarchical tree displayed in the navigation pane 652. Moreover, upon moving the cursor over the selected program statement 658 or performing some other input operation, the software development tool 420a, 420b . . . 420n may display the extended information on the previous program statement that affects the input parameter of the selected program statement 658. In FIG. 11, the extended information is displayed in a comment balloon 670. Alternatively, the extended information may be displayed in some other region of the GUI window 650.

Figure 12:
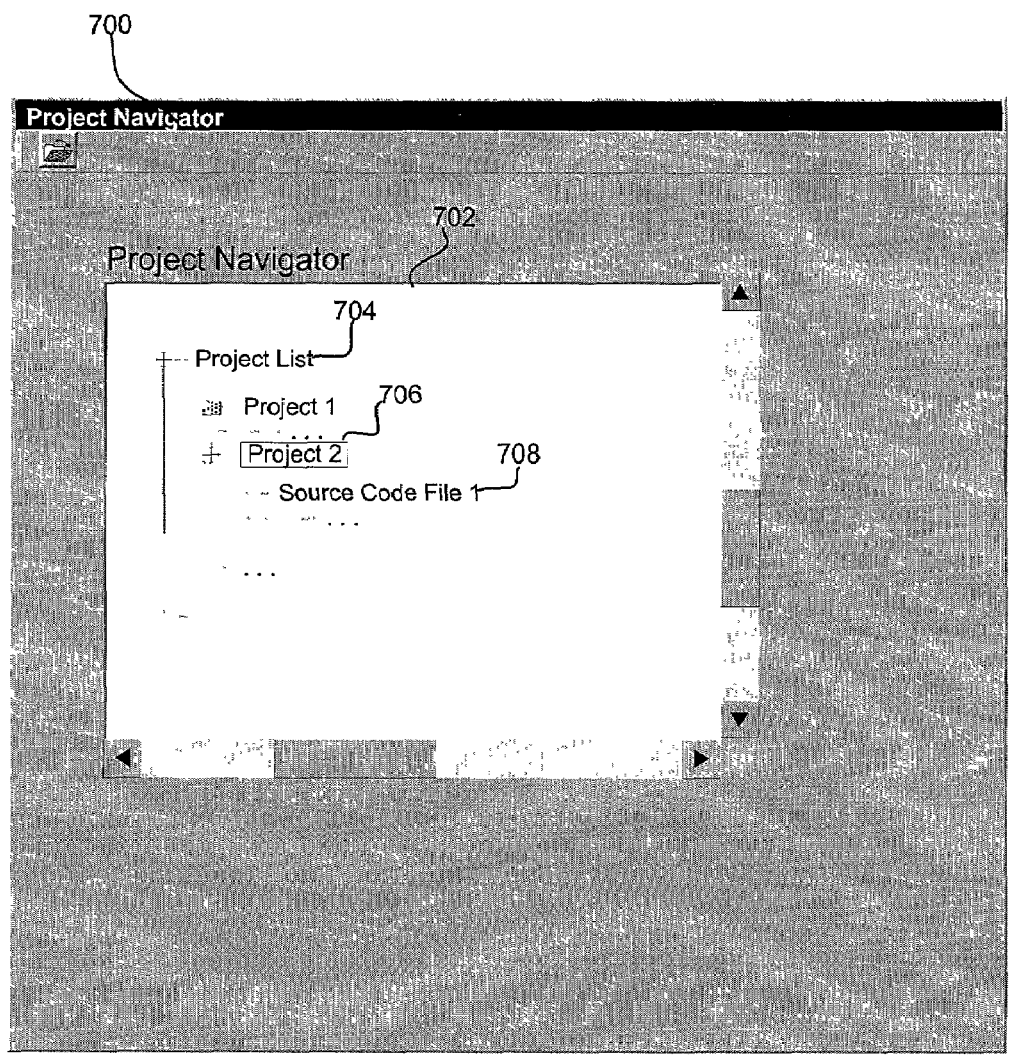
FIG. 12 illustrates a GUI panel enabling the user to navigate through projects and the source code files associates with such projects.

FIG. 12 illustrates a GUI window 700 displaying a project navigator 702 in which the programmer may view projects. In certain implementations, the project navigator 702 functions are implemented within the software development tool 420a, 420b . . . 420n. Expanding a project list 704 displays those projects that may be loaded into the software development tool 420a, 420b . . . 420n. Selecting displayed project 706 would expand the project 2 node 706 to cause the display of source code files 708 assigned to that project, where the source code files within a project contain source code statements that may be affected by the code modifications. In further implementations, selection of a source code file node may display those source code statements within the source code file affected by the code modification. In this way, the programmer can view projects and the source code files assigned to such projects for the programmer to consider. As discussed, such projects may be assigned to the programmer by a system analyst running the impact analysis tool 410 to generate projects to assign to different programmers or the programmer running the impact analysis tool 410 to generate a project of source code files to consider.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations of FIG. 2, the database comprised a relational database having a separate program statement table and a separate table for each considered program artifact. Those skilled in the art will appreciate that the statement and program artifact data in the tables of FIG. 2 may be implemented in an any type of data store known in the art, such as a relational database having a different table and record structure, a database system other than a relational database as described herein (e.g., an object oriented database), a flat file or one or more files or data structures.

In further implementations, the records in the artifact database 12 may include additional fields concerning more detail on the format and structure of the program artifacts and their relationship to one another. Additionally, the tables and fields in the tables described with respect to FIG. 2 may have additional fields or have the data implemented in tables in a different manner.

The described implementations discussed an impact analysis performed with respect to program artifacts comprising an affected I/O buffer, file and variable program. In further implementations, additional program artifacts or data structures known in the art may be subject to the impact analysis.

The described implementations discussed an impact analysis of a selected statement on program statements in the source code file including the selected statement and in other source code files. Additionally, the impact analysis of the present invention may be used to determine the impact of a selected program statements on program statements within the source code file including the selected program statements, and not in any other source code files.

The described implementations may be utilized to maintain metadata on the program artifacts on any number of designated programs. Further, the source code files 4a, 4b . . . 4n and software development tools described herein do not have to be implemented in an enterprise computing system. Additionally, the source code files 4a, 4b . . . 4n and software development tools 6 may be maintained at a single computer workstation, where the tools 6 are deployed when modifying any of the source code files 4a, 4b . . . 4n.

The impact result metadata 414 may be maintained in any data structure format known in the art to indicate program statements affected by a selected program statement, either directly or indirectly, and the chain of how one statement affects the other, i.e., how the output parameter of one statement is the input parameter in another.

In the described implementations, the structured result metadata 416 was implemented as an XML file. In alternative implementations, the structured result metadata 416 may be implemented in any data structure format known in the art that is capable of indicating an association of different elements and provide information on those elements. Additionally, alternative arrangements of the element objects shown in an XML document that differ form the arrangement shown in FIG. 8 may be used.

In described implementations, the structured result metadata 416 used by the software development tools 420a, 420b . . . 420n was generated after impact result metadata 414 is generated by the impact analysis tool 410. Alternatively, the impact analysis tool 414 may directly generate structured result metadata 416.

FIG. 11 illustrates a GUI window in which a navigation pane 652 and code editing pane 654 are both shown. Those skilled in the art will appreciate that the information shown in FIG. 11 and maintained in the program manifests 418a, 418b . . . 418n may be displayed in alternative formats and arrangements. For instance, the navigation pane 652 and editing pane 654 may be shown in separate GUI windows.

Additional data may be displayed in the GUIs than shown in the example. For instance, the code editing pane may include a feature to allow the programmer to display information on the proposed modification to the selected program statement while viewing the affected program statement.

The described logic of FIGS. 3, 4, 5a, 5b, 5c, 7, 9, and 10 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for enabling analysis of proposed changes to program statements in a source code files, comprising;

generating a data structure in a computer readable medium indicating a plurality of program statements in one or more source code files affected by one of a plurality of selected program statements to change in one or more source code files, wherein the data structure indicates a hierarchical relationship of the effect of program statements on one another resulting from the changes to the selected program statements; and processing the data structure in the computer readable medium to display information on the hierarchical relationship of the effect of the program statements on one another resulting from changes to the selected program statements.

2. The method of claim 1, wherein generating the data structure comprises;

generating an element object in the data structure for one selected program statement to change; and generating element objects in the data structure for program statements that are directly or indirectly affected by the selected program statements, wherein the element object representing one program statement is defined as a child element object to the element object for one program statement whose output parameter comprises an input parameter of the program statement represented by the child element object.

3. The method of claim 2, wherein the element object is associated with an identifier of the source code file including the program statement for which the element object is generated and a line number where the program statement is included in the source code file.

4. The method of claim 3, wherein the identifier comprises a location of the source code file.

5. The method of claim 2, wherein the data structure is implemented as an extensible markup language (XML) file.

6. The method of claim 1, further comprising:

processing a database including information on program statements and program artifacts in a plurality of source code files; and generating result metadata indicating program statements directly or indirectly affected by changes to the selected program statements, wherein the program statements indicated as affected by the proposed changes are capable of comprising program statements in the plurality of the source code files, and wherein the data structure is generated from the metadata.

7. The method of claim 1, further comprising:

assigning at least one source code file to a project; and importing the project to a software development tool to enable a programmer to process the program statements in the at least one source code file assigned to the project.

8. The method of claim 7, wherein a system analyst generates the data structure and assigns the source code files to projects that are imported to the programmer software development tools to enable the programmer to process the program statements indicated in the data structure as affected by the selected program statements to change.

9. A computer implemented method for analyzing proposed changes to program statements in a source code file, comprising:

receiving a data structure indicating a plurality of program statements affected by one of a plurality of selected program statements to change, wherein the data structure indicates a hierarchical relationship of the effect of program statements on one another;

displaying the hierarchical relationship of the program statements affected by one of the selected program statements;

receiving user input indicating selection of one of the displayed program statements; and enabling editing of the selected program statement.

10. The method of claim 9, wherein displaying the hierarchical relationship of the program statements further comprises:

displaying one program statement affected directly or indirectly by changes to one selected program statement; and displaying one program statement as a child in the hierarchical relationship to the program statement whose output parameter comprises an input parameter of the child program statement.

11. The method of claim 9, wherein receiving the selection of one of the displayed program statements comprises receiving user input directly selecting one displayed program statement in the displayed hierarchical relationship.

12. The method of claim 9, wherein the data structure is capable of indicating program statements affected by other program statements across source code files.

13. The method of claim 9, wherein enabling editing of the selected displayed program statement further comprises:

determining one of a plurality of source code files capable of including the selected displayed program statement;

accessing the determined source code file; and displaying in an editing mode a plurality of program statements from the determined source code file including the selected displayed program statement.

14. The method of claim 13, further comprising:

displaying information on proposed changes to the program statement affecting the selected displayed program statement.

15. The method of claim 13, wherein the hierarchical relationship of the program statements are displayed in a first pane on a graphical user interface panel and wherein the plurality of program statements displayed in editing mode are displayed in a second pane on the graphical user interface.

16. The method of claim 15, wherein a scrolling feature is used to view the program statements in the hierarchical relationship in the first pane.

17. A system for enabling analysis of proposed changes to program statements in a source code files, comprising:

a computer readable medium;

a display monitor;

means for generating a data structure in the computer readable medium indicating a plurality of program statements in one or more source code files affected by one of a plurality of selected program statements to change in one or more source code files, wherein the data structure indicates a hierarchical relationship of the effect of program statements on one another resulting from the changes to the selected program statements; and means for processing the data structure to display information on the display monitor concerning the hierarchical relationship of the effect of the program statements on one another resulting from the changes to the selected program statements.

18. The system of claim 17, wherein the means for generating the data structure performs:

generating an element object in the data structure for one selected program statement to change; and generating element objects in the data structure for program statements that are directly or indirectly affected by the selected program statements, wherein the element object representing one program statement is defined as a child element object to the element object for one program statement whose output parameter comprises an input parameter of the program statement represented by the child element object.

19. The system of claim 18, wherein the element object is associated with an identifier of the source code file including the program statement for which the element object is generated and a line number where the program statement is included in the source code file.

20. The system of claim 19, wherein the identifier comprises a location of the source code file.

21. The system of claim 18, wherein the data structure is implemented as an extensible markup language (XML) file.

22. The system of claim 17, further comprising:
a storage medium;
a database stored in the storage medium;
means for processing the database including information on program statements and program artifacts in a plurality of source code files; and
means for generating result metadata indicating program statements directly or indirectly affected by changes to the selected program statements, wherein the program statements indicated as affected by the proposed changes are capable of comprising program statements in the plurality of the source code files, and wherein the data structure is generated from the metadata.

23. The system of claim 17, further comprising:
means for assigning at least one source code file to a project; and
means for importing the project to a software development tool to enable a programmer to process the program statements in the at least one source code file assigned to the project.

24. The system of claim 23, wherein a system analyst generates the data structure and assigns the source code files to projects that are imported to programmer software development tools to process the program statements indicated in the data structure as affected by the selected program statements to change.

25. A system for analyzing proposed changes to program statements in a source code file, comprising:
means for receiving a data structure indicating a plurality of program statements affected by one of a plurality of selected program statements to change, wherein the data structure indicates a hierarchical relationship of the effect of program statements on one another;
means for displaying the hierarchical relationship of the program statements affected by one of the selected program statements;
means for receiving user input indicating selection of one of the displayed program statements; and
means for enabling editing of the selected program statement.

26. The system of claim 25, wherein the means for displaying the hierarchical relationship of the program statements further performs:
displaying one program statement affected directly or indirectly by changes to one selected program statement; and
displaying one program statement as a child in the hierarchical relationship to the program statement whose output parameter comprises an input parameter of the child program statement.

27. The system of claim 25, wherein the means for receiving the selection of one of the displayed program statements receives user input directly selecting one displayed program statement in the displayed hierarchical relationship.

28. The system of claim 25, wherein the data structure is capable of indicating program statements affected by other program statements across source code files.

29. The system of claim 25, wherein the means for enabling editing of the selected displayed program statement further performs:
determining one of a plurality of source code files capable of including the selected displayed program statement;
accessing the determined source code file; and
displaying in an editing mode a plurality of program statements from the determined source code file including the selected displayed program statement.

30. The system of claim 29, further comprising
means for displaying information on proposed changes to the program statement affecting the selected displayed program statement.

31. The system of claim 29, wherein the hierarchical relationship of the program statements are displayed in a first pane on a graphical user interface panel and wherein the plurality of program statements displayed in editing mode are displayed in a second pane on the graphical user interface.

32. The system of claim 31, wherein a scrolling feature is used to view the program statements in the hierarchical relationship in the first pane.

33. An article of manufacture including code executed by a computer for enabling analysis of proposed changes to program statements in source code files, wherein the code is executed to perform operations, the operations comprising:
generating a data structure indicating a plurality of program statements in one or more source code files affected by one of a plurality of selected program statements to change in one or more source code files, wherein the data structure indicates a hierarchical relationship of the effect of program statements on one another resulting from the changes to the selected program statements; and
processing the data structure to display information on the hierarchical relationship of the effect of the program statements on one another resulting from changes to the selected program statements.

34. The article of manufacture of claim 33, wherein generating the data structure comprises;
generating an element object in the data structure for one selected program statement to change; and
generating element objects in the data structure for program statements that are directly or indirectly affected by the selected program statements, wherein the element object representing one program statement is defined as a child element object to the element object for one program statement whose output parameter comprises an input parameter of the program statement represented by the child element object.

35. The article of manufacture of claim 34, wherein the element object is associated with an identifier of the source code file including the program statement for which the element object is generated and a line number where the program statement is included in the source code file.

36. The article of manufacture of claim 35, wherein the identifier comprises a location of the source code file.

37. The article of manufacture of claim 34, wherein the data structure is implemented as an extensible markup language (XML) file.

38. The article of manufacture of claim 33, further comprising:

processing a database including information on all program statements and program artifacts in a plurality of source code files; and generating result metadata indicating program statements directly or indirectly affected by changes to the selected program statements, wherein the program statements indicated as affected by the proposed change are capable of comprising program statements in the plurality of the source code files, and wherein the data structure is generated from the metadata.

39. The article of manufacture of claim 33, further comprising:

assigning at least one source code file to a project; and importing the project to a software development tool to enable a programmer to process the program statements in the at least one source code file assigned to the project.

40. The article of manufacture of claim 39, wherein a system analyst generates the data structure and assigns the source code files to projects that are imported to the programmer software development tools to enable the programmer to process the program statements indicated in the data structure as affected by the selected program statements to change.

41. An article of manufacture including code executed by a computer for analyzing proposed changes to program statements in a source code file, wherein the code is executed to perform operations, the operations comprising:

receiving a data structure indicating a plurality of program statements affected by one of a plurality of selected program statements to change, wherein the data structure indicates a hierarchical relationship of the effect of program statements on one another;

displaying the hierarchical relationship of the program statements affected by one of the selected program statements;

receiving user input indicating selection of one of the displayed program statements; and enabling editing of the selected program statement.

42. The article of manufacture of claim 41, wherein displaying the hierarchical relationship of the program statements further comprises:

displaying one program statement affected directly or indirectly by changes to one selected program statement; and displaying one program statement as a child in the hierarchical relationship to the program statement whose output parameter comprises an input parameter of the child program statement.

43. The article of manufacture of claim 41, wherein receiving the selection of one of the displayed program statements comprises receiving user input directly selecting one displayed program statement in the displayed hierarchical relationship.

44. The article of manufacture of claim 41, wherein the data structure is capable of indicating program statements affected by other program statements across source code files.

45. The article of manufacture of claim 41, wherein enabling editing of the selected displayed program statement further comprises:

determining one of a plurality of source code files capable of including the selected displayed program statement;

accessing the determined source code file; and displaying in an editing mode a plurality of program statements from the determined source code file including the selected displayed program statement.

46. The article of manufacture of claim 45, further comprising:

displaying information on proposed changes to the program statement affecting the selected displayed program statement.

47. The article of manufacture of claim 45, wherein the hierarchical relationship of the program statements are displayed in a first pane on a graphical user interface panel and wherein the plurality of program statements displayed in editing mode are displayed in a second pane on the graphical user interface.

48. The article of manufacture of claim 47, wherein a scrolling feature is used to view the program statements in the hierarchical relationship in the first pane.

* * * * *